United States Patent
Iwata

(10) Patent No.: US 6,870,883 B2
(45) Date of Patent: Mar. 22, 2005

(54) PARALLEL ENCODING AND DECODING PROCESSOR SYSTEM AND METHOD

(75) Inventor: Eiji Iwata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/352,422

(22) Filed: Jul. 12, 1999

(65) Prior Publication Data

US 2002/0031184 A1 Mar. 14, 2002

(30) Foreign Application Priority Data

Jul. 15, 1998 (JP) .......................................... P10-200353

(51) Int. Cl.[7] .............................................. H04B 1/66
(52) U.S. Cl. ............................................... 375/240.01
(58) Field of Search ....................... 375/240.01, 240.12, 375/240, 240.02, 240.03, 240.15; 348/405.1, 406.1, 407.1, 416.1, 417.1, 412.1, 413.1, 414.1; 275/240.12, 240.13, 240.14; H04N 1/66; H04B 2/66

(56) References Cited

U.S. PATENT DOCUMENTS

| | | | | |
|---|---|---|---|---|
| 5,376,968 A | * | 12/1994 | Wu et al. ................. | 348/413.1 |
| 5,469,273 A | * | 11/1995 | Demura ....................... | 358/426 |
| 5,504,823 A | * | 4/1996 | Yoon ........................... | 382/233 |
| 5,583,500 A | * | 12/1996 | Allen et al. .................. | 341/107 |
| 5,675,331 A | * | 10/1997 | Watanabe et al. ............. | 341/67 |
| 5,689,254 A | * | 11/1997 | Fujiwara et al. .............. | 341/59 |
| 5,699,119 A | * | 12/1997 | Chung et al. ................. | 348/405 |
| 5,701,160 A | * | 12/1997 | Kimura et al. ........... | 348/413.1 |
| 5,757,668 A | * | 5/1998 | Zhu ....................... | 364/514 R |
| 5,815,217 A | * | 9/1998 | Kumazawa et al. ........ | 348/700 |
| 6,005,623 A | * | 12/1999 | Takahashi et al. .......... | 348/402 |
| 6,020,835 A | * | 2/2000 | Hasegawa ..................... | 341/67 |
| 6,167,087 A | * | 12/2000 | Kato ..................... | 375/240.03 |

* cited by examiner

Primary Examiner—Tung Vo
(74) Attorney, Agent, or Firm—Sonnenschein, Nath & Rosenthal LLP

(57) ABSTRACT

Encoding and decoding systems for MPEG encoding and decoding at a high speed using a parallel processing system, wherein macroblocks to be processed are designated for first to third processors which are made to carry out all processings of encoding, variable length coding, and local decoding of those macroblocks; the variable length coding is carried out after confirming that the variable length coding with respect to the previous macroblock is ended; the variable length coding which was normally sequentially carried out at a specific processor is carried out at all of the processors; and the encoding and local decoding are carried out at all of the processors; whereby the loads are dispersed, the efficiency is improved as a whole, and the processing speed becomes fast.

19 Claims, 21 Drawing Sheets

1, 9

PARALLEL ENCODING AND DECODING PROCESSOR SYSTEM AND METHOD

BACKGROUND OF THE INVENTION

1. Field of the Invention

The present invention relates to an encoding apparatus for transforming data such as video data and audio data, for example, the MPEG method (high quality moving picture encoding system by Moving Picture Coding Experts Group), to a bit stream composed of variable length data, and to a decoding apparatus of the same, and more particularly relates to an encoding apparatus and a decoding apparatus for carrying out encoding and decoding at a high speed by parallel processing and methods of the same.

2. Description of the Related Art

First, an explanation will be made of the MPEG method (MPEG1 and MPEG2)—the standard encoding and decoding system of images currently in general used.

FIG. 1 is a view of the structure of image data in the MPEG method.

As shown in FIG. 1, the image data of the MPEG method is comprised in a hierarchical structure.

The hierarchy is, in order from the top, a video sequence (hereinafter simply referred to as a "sequence"), groups of pictures (GOP), pictures, slices, macroblocks, and blocks.

In MPEG encoding, the image data is sequentially encoded based on this hierarchical structure so as to be transformed to a bit stream.

The structure of a bit stream of MPEG encoded data is shown in FIG. 2.

In the bit stream of FIG. 2, each picture has j number of slices, and each slice has i number of macroblocks.

Further, each level of data other than the blocks in the hierarchy shown in FIG. 1 has a header in which an encoding mode etc. are stored. Accordingly, when describing the structure of a bit stream from the headers of the video sequence, it becomes a sequence header (SEQH) 151, a GOP header (GOPH) 152, a picture header (PH) 153, a slice header (SH) 154, a macroblock header (MH) 155, compressed data (MB0) 156 of a macroblock 0, a macroblock header (MH) 157, and compressed data (MB1) 158 of a macroblock 1.

Note that the size of the compressed data of a macroblock contained in a bit stream is of a variable length and differs depending on the nature of the image etc.

In MPEG decoding, this bit stream is sequentially decoded and the image is reconstructed based on the hierarchical structure of FIG. 14.

Next, the structure of a processing unit for carrying out the encoding and the decoding by the MPEG method, the processing algorithms, and the flow of the processing will be concretely explained.

First, an explanation will be made of the encoding.

FIG. 3 is a block diagram of the configuration of a general processing unit for carrying out MPEG encoding.

An encoding apparatus 160 shown in FIG. 3 has a motion vector detection unit (ME) 161, a subtractor 162, a Fourier discrete cosine transform (FDCT) unit 163, a quantization unit 164, a variable length coding unit (VLC) 165, an inverse quantization unit (IQ) 166, an inverse discrete cosine transform (IDCT) unit 167, an adder 168, a motion compensation unit (MC) 169, and an encode control unit 170.

In an encoding apparatus 160 having such a configuration, when the encoding mode of the input image data is a P (predictive coded) picture or B (bidirectionally predictive coded) picture, the motion compensation prediction is carried out in units of macroblocks at the motion vector detection unit 161, a predicted error is detected at the subtractor 162, DCT is carried out with respect to the predicted error at the discrete cosine transform unit 163, and thereby a DCT coefficient is found. Further, when the encoded picture is an I (Intra-coded) picture, the pixel value is input to the discrete cosine transform unit 163 as it is, DCT is carried out, and thereby the DCT coefficient is found.

The found DCT coefficient is quantized at the quantization unit 164 and subjected to variable length coding together with the motion vector or encoding mode information at the variable length coding unit 165, whereby an encoded bit stream is generated. Further, the quantized data generated at the quantization unit 164 is inversely quantized at the inverse quantization unit 166, subjected to IDCT at the inverse discrete cosine transform unit 167 to be restored to an original predicted error, and added to a reference image at the adder 168, whereby a reference image is generated at the motion compensation unit 169.

Note that, the encode control unit 170 controls the operation of these parts of the encoding apparatus 160.

Such encoding is generally roughly classified into processing at three processing units, that is, the encoding from the motion vector detection at the motion vector detection unit 161 to the quantization at the quantization unit 164, the variable length coding in the variable length coding unit 165 for generating the bit stream, and the local decoding from the inverse quantization in the inverse quantization unit 166 to the motion compensation in the motion compensation unit 169.

Next, an explanation will be made of the flow of the processing for carrying out such encoding and generating an encoded bit stream having the structure shown in FIG. 2 by referring to FIG. 4.

FIG. 4 is a flow chart of the flow of the processing for generating a bit stream by carrying out MPEG encoding.

When the encoding is started (step S180), a sequence header is generated (step S181), a GOP header is generated (step S182), a picture header is generated (step S183), and a slice header is generated (step S184).

When the generation of headers of the different levels is ended, macroblock encoding is carried out (step S185), macroblock variable length coding is carried out (step S186), and macroblock local decoding is carried out (step S187).

When the encoding is ended for all macroblocks inside a slice, the processing routine, shifts to the processing of the next slice (step S188). Below, similarly, when all processing of a picture is ended, the processing routine shifts to the processing of the next picture (step S189). When all processing of one GOP is ended, the processing routine shifts to the processing of the next GOP (step S190). This series of processing is repeated until the sequence is ended (step S191), whereupon the processing is ended (step S192).

A timing chart showing the sequential execution of such encoding by a processor, for example, a digital signal processor (DSP), is shown in FIG. 5.

As shown in FIG. 5, in the processor, the processing of the flow chart shown in FIG. 4 is sequentially carried out for every macroblock.

Note that, in FIG. 5, the processing "MBx-ENC" indicates the encoding with respect to the data of an (x+1)th macroblock x, the processing "MBx-VLC" indicates variable length coding with respect to the data of the (x+1)th macroblock x, and the processing "MBx-DEC" indicates the local encoding with respect to the data of the (x+1)th macroblock x.

Next, an explanation will be made of the decoding.

FIG. 6 is a block diagram of the configuration of a general processing unit for carrying out the MPEG decoding.

A decoding apparatus 200 shown in FIG. 6 has a variable length decoding unit (VLD) 201, an inverse quantization unit (IQ) 202, an inverse discrete cosine transform unit (IDCT) 203, an adder 204, a motion compensation unit (MC) 205, and a decode control unit 206.

In a decoding apparatus 200 having such a configuration, a bit stream of the input encoded data is decoded at the variable length decoding unit 201 to separate the encoding mode, motion vector, quantization information, and quantized DCT coefficient for every macroblock. The decoded quantized DCT coefficient is subjected to inverse quantization at the inverse quantization unit 202, restored to the DCT coefficient, subjected to IDCT by the inverse discrete cosine transform unit 203, and transformed to pixel space data.

When the block is in the motion compensation prediction mode, the motion compensation predicted block data is added at the adder 204 to restore and output the original data. Further, the motion compensation unit 205 carries out motion compensation prediction based on the decoded image to generate the data to be added at the adder 204.

Note that the decode control unit 206 controls the operations of these units of the decoding apparatus 200.

Note that such decoding may be generally roughly classified into processing at two processing units, that is, the variable length decoding at the variable length decoding unit 201 for decoding the bit stream and the decoding from the inverse quantization in the inverse quantization unit 202 to the motion compensation in the motion compensation unit 205.

Next, an explanation will be made of the flow of the processing for carrying out such decoding to decode an encoded bit stream having the structure shown in FIG. 2 by referring to FIG. 7.

FIG. 7 is a flow chart showing the flow of the processing for generating the original image data by carrying out MPEG decoding.

When the decoding is started (step S210), the sequence header is decoded (step S211), the GOP header is decoded (step S212), the picture header is decoded (step S213), and the slice header is decoded (step S214).

When the decoding of the headers of the different levels is ended, macroblock variable length decoding is carried out (step S215), and decoding of the macroblock is carried out (step S216).

When the decoding is ended for all macroblocks inside the slice, the processing routine shifts to the processing of the next slice (step S217). Below, similarly, when all processing of one picture is ended, the processing routine shifts to the processing of the next picture (step S218), and when all processing of one GOP is ended, the processing routine shifts to the processing of the next GOP (step S219). This series of processings is repeated until the sequence is ended (step S220), whereupon the processing is ended (step S221).

A timing chart of the sequential execution of such decoding by a processor, for example, a DSP, is shown in FIG. 8.

As shown in FIG. 8, in the processor, processing of the flow chart shown in FIG. 7 is sequentially carried out for every slice and for every macroblock inside each slice.

Note that, in FIG. 8, the processing "SH-VLD" indicates the slice header decoding, the processing "MBx-VLD" indicates the variable length decoding with respect to the encoded data of the (x+1)th macroblock x, and the processing "MBx-DEC" indicates the decoding with respect to the encoded data of the (x+1)th macroblock x.

Summarizing the disadvantage to be solved by the invention, there is a demand that such encoding and decoding of image and other data be efficiently carried out at a high speed by a parallel processor having a plurality of processors. However, the parallel processors and parallel processing methods heretofore have suffered from various disadvantages, so have not been able to carry out high speed processing with a sufficiently high efficiency.

Specifically, first, when it is desired to carry out the encoding and decoding efficiently by parallel processing, there is a disadvantage that it is difficult to determine how to allocate which steps to the plurality of processors.

Further, in such encoding and decoding, since variable length data is to be processed, sequential processing must be carried out as the order of the data processing in the variable length coding and variable length decoding. For this reason, there is the disadvantage that the parallel processing is interrupted at the time of execution of the sequential processing parts or that the processing speed is limited since the sequential processing parts become an obstacle.

Further, if the times for execution of the processing in the processors are equal, the loads become uniform and equal and efficient processing can be carried out, but since the processing times of the different steps are different, there is a disadvantage that the loads of the processors become nonuniform and unequal and therefore high efficiency processing cannot be carried out.

Further, in such a parallel processing method, since in the case of for example the above image data, the processing with respect to one set of data like one video segment is carried out divided among a plurality of processors, it is necessary to carry out synchronization along with the transfer of the data or control the communication, so there is the disadvantage that the configuration of the hardware, the control method, etc. become complex.

Further, since the processing to be carried out at the different processors differ, processing programs must be prepared for the individual processors and the processing must be separately controlled for the individual processors, so there is the disadvantage that the configuration of the hardware, control method, etc. become even more complex.

SUMMARY OF THE INVENTION

An object of the present invention is to provide an encoding apparatus and a decoding apparatus having a plurality of processors capable of carrying out the encoding and decoding of for example image data at a high speed and having simple configurations.

Further, another object of the present invention is to provide an encoding method and a decoding method which can be applied to parallel processors having any configurations and capable of carrying out the encoding and decoding of for example image data at a high speed.

According to a first aspect of the present invention, there is provided an encoding apparatus for encoding a data which comprises a plurality of block data including a plurality of element data which are sequentially transferred in a form of a data stream, the encoding apparatus comprising a plurality of signal processing devices connected by a signal transfer means on which the data is transferred, each signal processing device comprising; an encoding means for encoding a block data including a plurality of element data on the signal transfer means, and a variable length coding means for carrying out a variable length coding of the encoded block data and outputting the variable length coded data via the signal transfer means in accordance with the data stream.

According to a second aspect of the present invention, there is provided an encoding method for encoding a data stream having a plurality of element data, comprising the steps of; dividing the data stream into a predetermined plurality of block data, successively allotting the divided plurality of block data to a plurality of signal processing devices, encoding the allotted block data based on a predetermined method in each of the plurality of signal processing devices, successively carrying out variable length coding on the encoded data in the same signal processing devices as those for the encoding so that the encoded data for every the block data encoded in the plurality of signal processing devices are successively subjected to the variable length coding according to the order in the data stream, and successively allotting new block data to the signal processing devices for which the variable length coding is ended.

According to a third aspect of the present invention, there is provided a decoding apparatus for decoding encoded and variable length coded data which comprises a plurality of block data including a plurality of element data in a form of a data stream, the decoding apparatus comprising a plurality of signal processing devices, each of the signal processing devices comprising; a variable length decoding means for successively carrying out variable length decoding on variable length coded block data in accordance with the data stream, and a decoding means for decoding the variable length decoded block data.

According to a fourth aspect of the present invention, there is provided a decoding method for decoding a variable length coded data stream obtained by encoding a data stream having a plurality of element data for every predetermined block data and further carrying out variable length coding, comprising the steps of; successively allotting the variable length coded data for every the block data successively arranged in the variable length coded data stream to a plurality of signal processing devices, successively carrying out variable length decoding on the variable length coded data for every allotted block data so that the variable length decoding carried out in the plurality of signal processing devices is successively carried out according to the order of the block data in the data stream in each of the plurality of signal processing devices, decoding the encoded data for every the block image data subjected to the variable length decoding in the same signal processing device in each of the plurality of signal processing devices, and allotting variable length coded data of new block data to be decoded next to the signal processing devices for which the decoding is ended.

BRIEF DESCRIPTION OF THE DRAWINGS

These and other objects and features of the present invention will become clearer from the following description of a preferred embodiment given with reference to the accompanying drawings, in which.

DESCRIPTION OF THE PREFERRED EMBODIMENTS

An explanation will be made next of a preferred embodiment of the present invention by referring to FIG. 9 to FIG. 21.

In the following embodiment, the present invention will be explained by taking as an example an image encoding/decoding apparatus carrying out parallel processing by a plurality of processors to encode and decode a moving picture by MPEG2.

Note that, as the units of processing when carrying out the parallel processing of the MPEG encoding and decoding, any of the levels shown in FIG. 1 or a pixel can be considered, but in the following embodiment, the explanation will be made of a case where a macroblock is selected as the unit of parallel processing.

When using a macroblock as the unit of parallel processing, the encoding, local decoding, and decoding can be executed in parallel inside one slice, but it is necessary to sequentially execute the variable length coding and variable length decoding. This is because, in variable length coding and variable length decoding, the compressed data of the macroblock has a variable length and the header position of the compressed data of a macroblock on the bit stream is not determined until the variable length coding or the variable length decoding of the macroblock immediately before this is completed.

Note that the same limitation applies in the case where the slice is used as the unit of parallel processing.

First Image Encoding/decoding apparatus

First, an explanation will be made of an image encoding/decoding apparatus of the related art for carrying out the encoding and decoding of an image as mentioned above by parallel processing.

Figure 9:
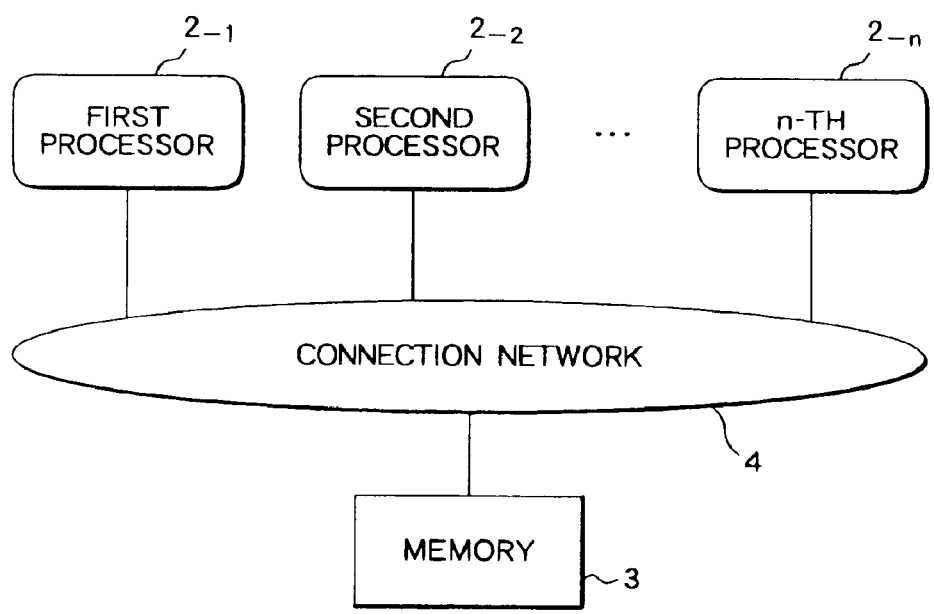
FIG. 9 is a schematic block diagram of the configuration of a parallel processing unit of an image encoding/decoding apparatus according to the present invention.

FIG. 9 is a schematic block diagram of the configuration of a parallel processing unit of an image encoding/decoding apparatus.

As shown in FIG. 9, the parallel processing unit 9 of the image encoding/decoding apparatus has n number of processors 2-1 to 2-n, a memory 3, and a connection network 4.

First, an explanation will be made of the configuration of this parallel processing unit 9.

The n number of processors 2-1 to 2-n are processors for independently carrying out predetermined processing. Each processor 2-i (i=1 to n) has a program read only memory (ROM) or program random access memory (RAM) storing a processing program to be executed and a RAM for storing data etc. regarding the processing. The processor 2-i carries out the predetermined processing according to the program stored in the program ROM or program RAM in advance.

Note that, in the present embodiment, it is assumed that n=3, that is, the parallel processing unit 9 has three processors 2-1 to 2-3.

Further, in the following explanation, the description will be made of only the processing concerning the encoding and decoding of the image data by the processors 2-1 to 2-n, but the processing for controlling the operation of the entire parallel processing unit 9 is carried out in one of the processors 2-i (i=1 to n) or in each of the n number of processors 2-1 to 2-n in parallel. By this control operation, the processors 2-1 to 2-n carry out the processing as will be explained below in association or in synchronization.

The memory 3 is a common memory of the n number of processors 2-1 to 2-n. The image data to be processed and the data of the processing result are stored in the memory 3. Data is appropriately read and written by n number of processors 2-1 to 2-n.

The connection network 4 is a connection portion for connecting the n number of processors 2-1 to 2-n and the memory 3 to each other so that the n number of processors 2-1 to 2-n operate in association or the n number of processors 2-1 to 2-n appropriately refer to the memory 3.

Next, an explanation will be made of the processing in each processor 2-i (i=1 to 3) and the processing of the parallel processing unit 9 where the parallel processing unit 9 having such a configuration is encoding a moving picture as mentioned above.

First, an explanation will be made of the processing in each processor 2-i.

In the parallel processing unit 9, the variable length coding of the macroblocks is allotted to one processor (hereinafter, this processor will be referred to as the "master processor") in a fixed manner and that processor made to sequentially execute the processing, and the encoding and the local decoding are allotted to other processors (hereinafter, these processors will be referred to as "slave processors") and those processors made to execute the parallel processing. In the parallel processing unit 9 shown in FIG. 9, the first processor 2-1 is made the master processor, and the second and the third processors 2-2 and 2-3 are made the slave processors.

Figure 10:
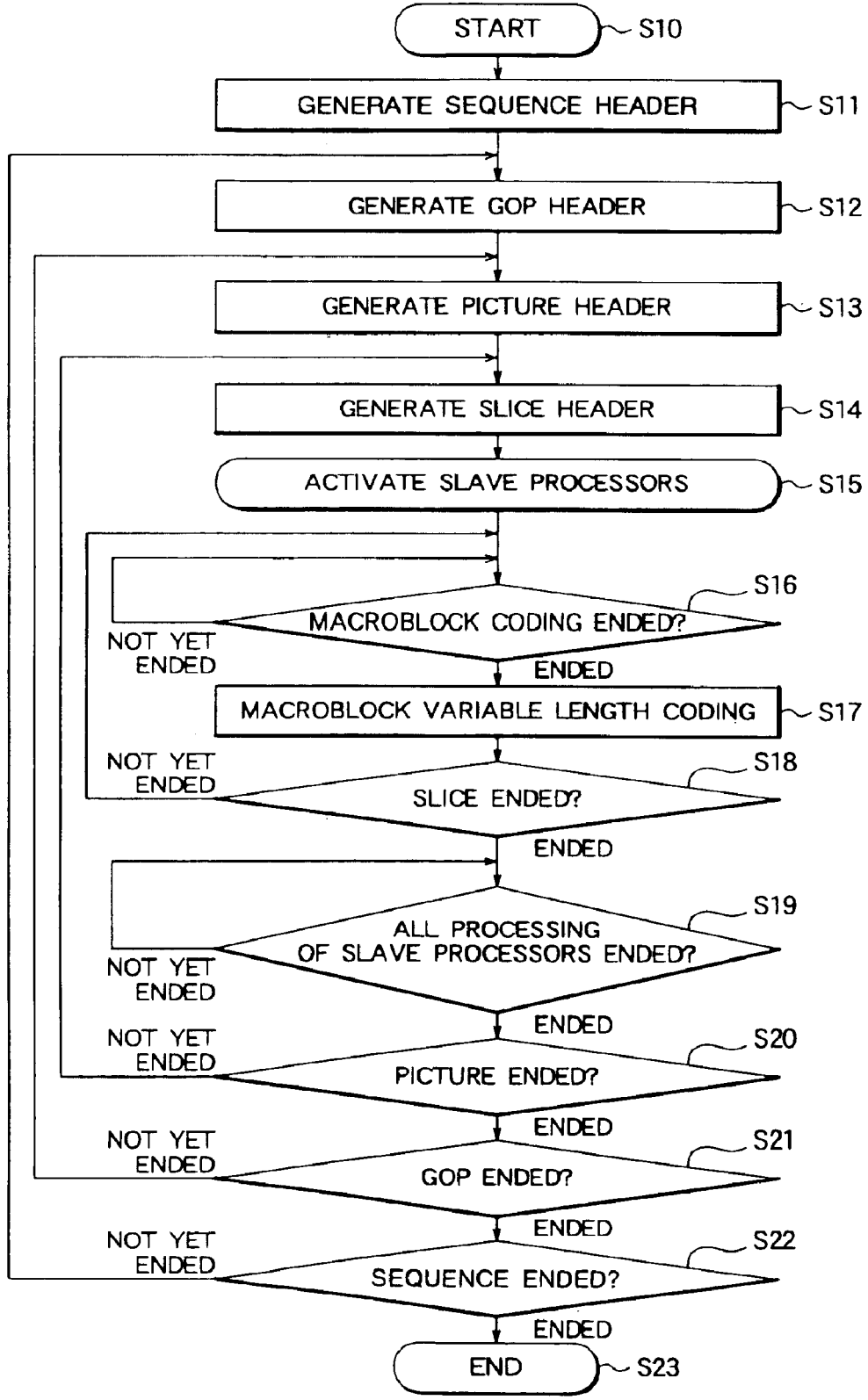
FIG. 10 is a flow chart of the processing in the case where an image is encoded by the conventional parallel processing method of in a master processor (first processor) of the parallel processing unit shown in FIG. 9.

First, the first processor 2-1 serving as the master processor carries out the processing as shown in the flow chart of FIG. 10.

Namely, when the encoding is started (step S10), the sequence header is generated (step S11), the GOP header is generated (step S12), the picture header is generated (step S13), and the slice header is generated (step S14).

When the generation of the slice header is ended, the master processor activates the slave processors (step S15) and enters into a state waiting for the end of the encoding in the slave processors (step S16).

When the encoding of the macroblocks in the slave processors is ended (step S16), the variable length coding of those macroblocks is started (step S17). Note that this variable length coding must be sequentially executed due to the limitation as mentioned above. Accordingly, even if the encoding of the macroblock 1 is ended before the encoding of the macroblock 0, the processor 0 first carries out the variable length coding of the macroblock 0 without fail.

The master processor repeats this procedure until all processing inside a slice is ended (step S18). When all processing inside the slice is ended, it waits for the end of all processing in the slave processors (step S19).

Below, similarly, when all processings of one picture are ended, the processing routine shifts to the processing of the next picture (step S20), and when the processing of all pictures of one GOP are ended, the processing routine shifts to the processing of the next GOP (step S21). Then, when these processing are repeated until the sequence is ended (step S22), the processing is ended (step S23).

Figure 11:
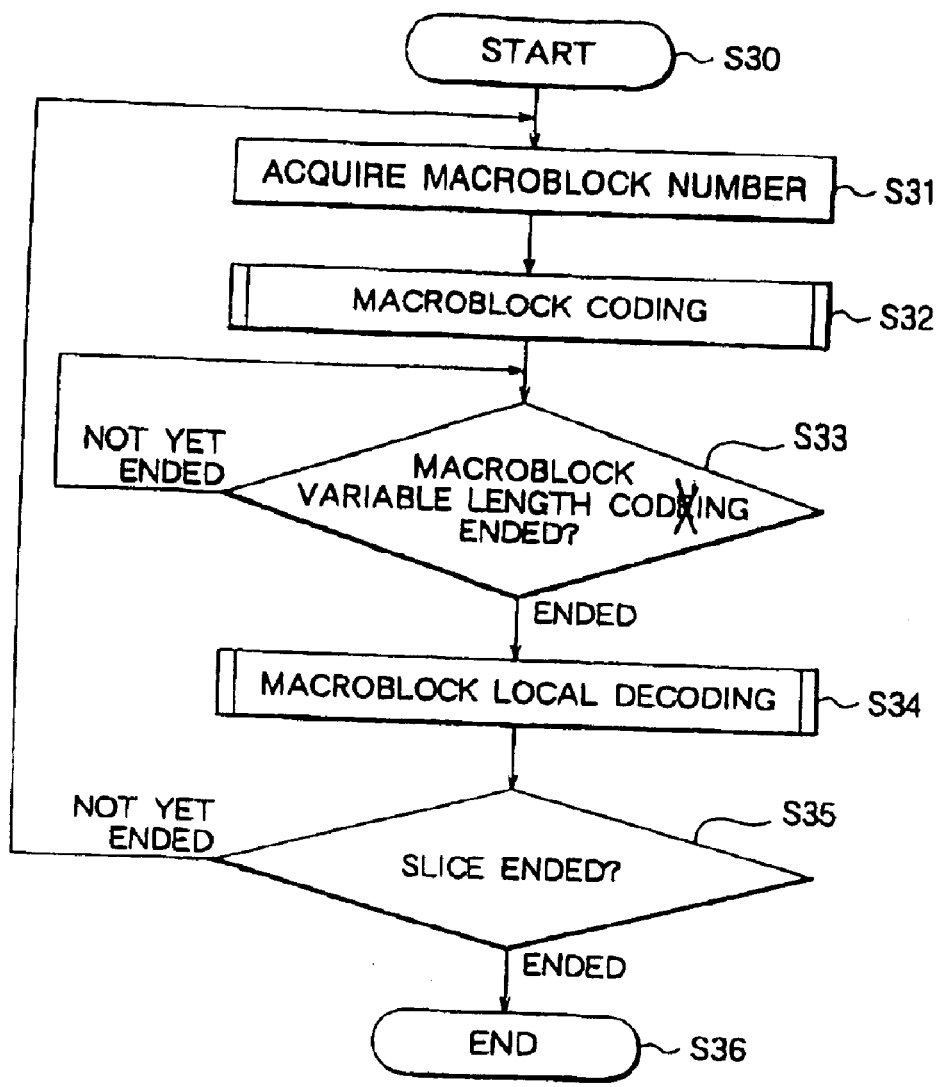
FIG. 11 is a flow chart of the processing in the case where an image is encoded by the conventional parallel processing method in slave processors (second to n-th processors) of the parallel processing unit shown in FIG. 9.

Next, the second and third processors 2-2 and 2-3 serving as the slave processors carry out the processing as shown in the flow chart of FIG. 11.

Namely, when started by the processing of step S15 in the master processor and starting the encoding (step S30), first each of the processors acquires the number of the macroblock to process (step S31) and encodes that macroblock (step S32).

When the encoding is ended, the slave processors wait for the end of the variable length coding in the master processor (step S33). When the variable length coding is ended, they carry out the local decoding (step S34).

This procedure is repeated until all processing inside a slice are ended (step S35). When all processing inside the slice is ended (step S35), the processing of the slave processors is ended (step S36).

Note that, the programs by which the master processor and slave processors carry out the processing are stored in advance in the program ROMs or the program RAMs provided with respect to the processors 2-i. The processors 2-i operate in accordance with these programs so as to carry out these processings.

Next, an explanation will be made of the operation of the parallel processing unit 9 when encoding a moving picture by referring to FIG. 12.

Figure 12:
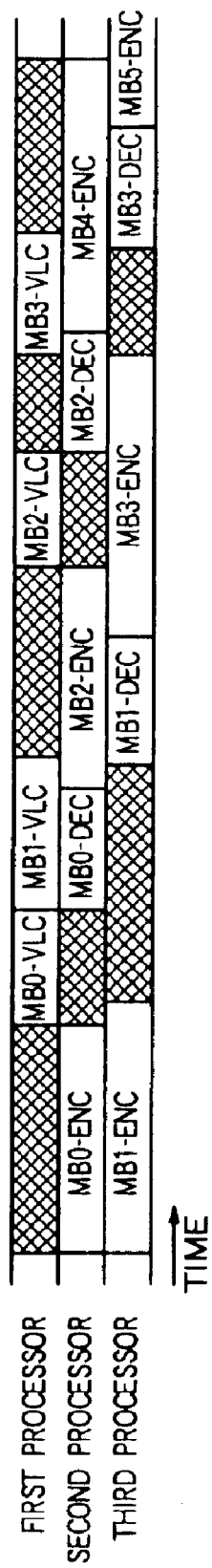
FIG. 12 is a timing chart of the state of processing in processors in a case where an image is encoded by the conventional parallel processing method in the parallel processing unit shown in FIG. 9.

FIG. 12 is a timing chart of the state of the encoding in the three processors 2-1 to 2-3.

Note that, in FIG. 12, the processing "MBx-ENC" indicates the encoding with respect to the (x+1)th macroblock x (step S32 in FIG. 11), the processing "MBx-DEC" indicates the local decoding with respect to the (x+1)th video segment x (step S34 in FIG. 11), and the processing "MBx-VLC" indicates the variable length coding with respect to the (x+1)th video segment x (step S17 in FIG. 10).

As shown in FIG. 12, when the encoding is started, first the second processor 2-2 and the third processor 2-3 carry out the encoding MB0-ENC and MB1-ENC of the macroblock 0 and the macroblock 1.

When the encoding MB0-ENC of the macroblock 0 in the second processor 2-2 is ended, the first processor 2-1 carries out the variable length coding MB0-VLC with respect to the encoded data.

The encoding MB1-ENC of the macroblock 1 in the third processor 2-3 is ended while the variable length coding MB0-VLC of the macroblock 0 is being carried out in the first processor 2-1, therefore, the first processor 2-1 subsequently carries out the variable length coding MB1-VLC with respect to the encoded data of the macroblock 1.

On the other hand, in the second processor 2-2, when the variable length coding MB0-VLC with respect to the macroblock 0 is ended in the first processor 2-1, the local decoding MB0-DEC with respect to that data is carried out. Then, when this local decoding MB0-DEC is ended, the encoding MB2-ENC with respect to the next macroblock 2 is carried out.

Also in the third processor 2-3, similarly, when the variable length coding MB1-VLC with respect to the macroblock 1 is ended in the first processor 2-1, the local decoding MB1-DEC with respect to that data is carried out. Then, when this local decoding MB1-DEC is ended, the encoding MB3-ENC with respect to the next macroblock 3 is carried out.

Below, similarly, in the first processor 2-1, the second processor 2-2, or the third processor 2-3, when the encoding MBx-ENC of the macroblock to be processed next is ended, the variable length coding MBx-VLC of the encoded data is sequentially carried out.

Further, in the second processor 2-2 and the third processor 2-3, when the variable length coding MBx-VLC is ended in the first processor 2-1, the local decoding MBx-DEC with respect to the macroblock thereof is carried out, and after the end of the processing, the encoding MBx-ENC with respect to the next macroblock x+1 is subsequently carried out.

Note that the variable length coding can be divided into the phase for generating the variable length data from the fixed length data by table conversion and the phase for combining the variable length data to generate the bit stream. These two phases may be sequentially executed, or only the latter phase may be sequentially executed and the former phase be executed in parallel. Note that a buffer memory becomes necessary between the former phase and the latter phase in the latter method.

Next, an explanation will be made of the processing in each processor 2-i (i=1 to 3) when decoding the moving picture as mentioned above in the parallel processing unit 9 and of the operation of the parallel processing unit 9.

First, an explanation will be made of the processing in each processor 2-i.

In the parallel processing unit 9, the variable length decoding of macroblocks is allotted to one processor (hereinafter this processor will be referred to as the "master processor") in a fixed manner and that processor made to sequentially execute the processing. The decoding is allotted to the other processors (hereinafter, these processors will be referred to as the "slave processors") and the slave processors made to carry out the parallel processing. In the parallel processing unit 9 shown in FIG. 9, the first processor 2-1 is made the master processor, and the second and the third processors 2-2 and 2-3 are made the slave processors.

Figure 13:
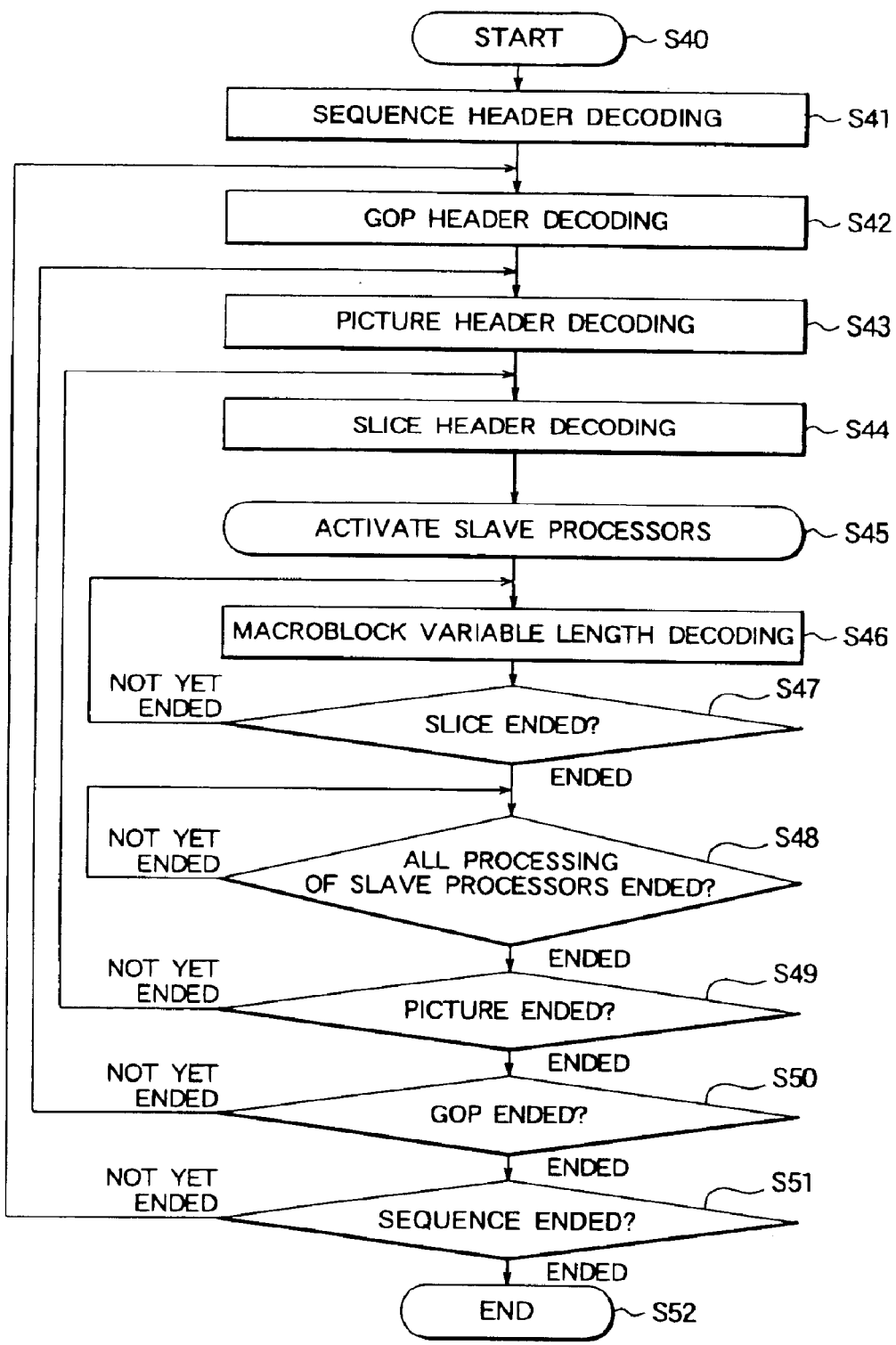
FIG. 13 is a flow chart of the processing in the case where an image is decoded by the conventional parallel processing method in the master processor (first processor) of the parallel processing unit shown in FIG. 9.

First, the first processor 2-1 serving as the master processor carries out the processing as shown in the flow chart of FIG. 13.

Namely, when the decoding is started (step S40), the sequence header is decoded (step S41), the GOP header is decoded (step S42), the picture header is decoded (step S43), and the slice header is decoded (step S44).

When the decoding of the slice header is ended, the master processor activates the slave processors (step S45) and carries out the variable length decoding with respect to a macroblock (step S46). The master processor repeatedly carries out this variable length decoding (step S47) until this processing is ended for all macroblocks inside the slice.

When the variable length decoding with respect to all macroblocks inside a slice is ended, the master processor waits for the end of all processings in the slave processors (step S48). When the processings in the slave processors are ended (step S48), the processing routine shifts to the processing with respect to the next picture (step S49).

When the processing of all pictures of one GOP is ended (step S49), the processing routine shifts to the processing of the next GOP (step S50). When the processing of all GOPs is ended (step S50), the processing routine shifts to the processing of the next sequence (step S51). This series of processing is repeated until all sequences are ended (step S51), whereby the processing is ended (step S52).

Figure 14:
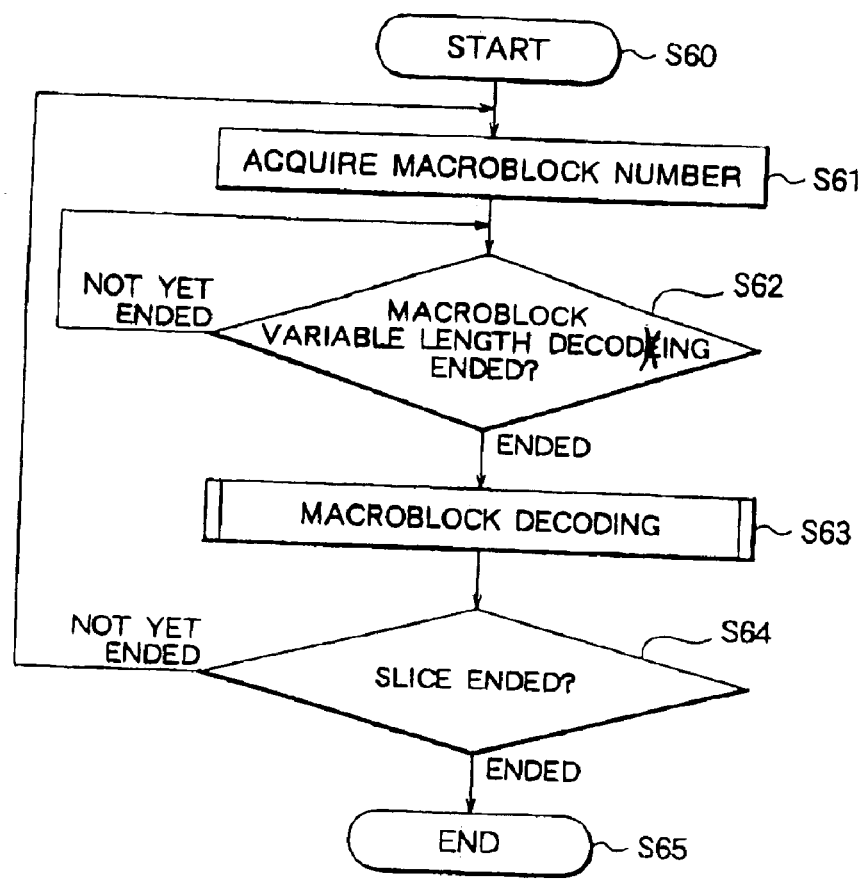
FIG. 14 is a flow chart of the processing in the case where an image is decoded by the conventional parallel processing method in slave processors (second to n-th processors) of the parallel processing unit shown in FIG. 9.

Next, the second and third processors 2-2 and 2-3 serving as the slave processors carry out the processing as shown in the flow chart of FIG. 14.

Namely, when started by the processing of step S45 in the master processor and starting the decoding (step S60), first each slave processor obtains the number of the macroblock to be processed (step S61) and waits for the end of the variable length decoding of the related macroblock at step S46 at the master processor (step S62).

Next, when the variable length decoding is ended, the slave processor decodes the macroblock using that data (step S63).

This procedure is repeated until the processing of all macroblocks inside the slice is ended (step S64). When all processing inside the slice is ended (step S64), the processing of the slave processors is ended (step S65).

Note that, the programs by which the master processor and slave processors carry out the processing are stored in advance in the program ROMs or the program RAMs provided with respect to the processors 2-i. The processors 2-i operate in accordance with these programs so as to carry out these processings.

Further, when a slice is used as the unit of parallel processing in the variable length decoding, the header of the next slice on the bit stream can be found without carrying out the variable length decoding. This becomes possible by finding the slice start code placed at the header of the slice by scanning. Accordingly, a processing method of carrying out only this scanning sequentially and carrying out the other processing containing the variable length decoding in parallel is possible.

Next, an explanation will be made of the operation of the parallel processing unit 9 when decoding a moving picture by referring to FIG. 15.

Figure 15:
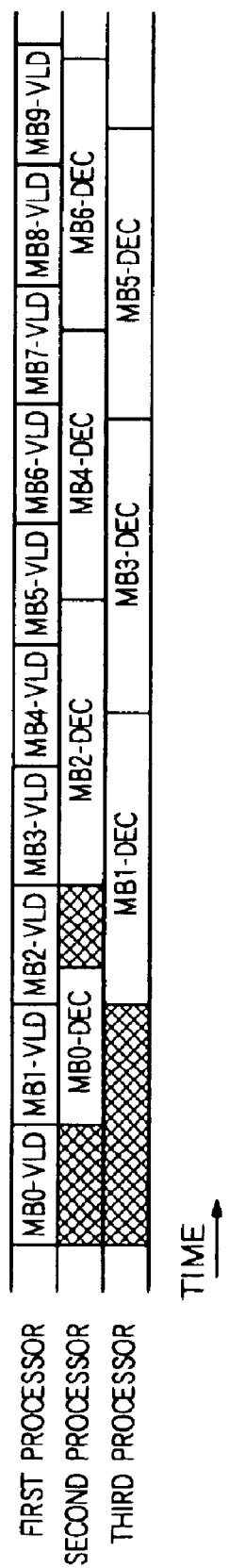
FIG. 15 is a timing chart of the state of processing in processors in a case where an image is decoded by the conventional parallel processing method in the parallel processing unit shown in FIG. 9.

FIG. 15 is a timing chart of the state of the decoding in the three processors 2-1 to 2-3.

Note that, in FIG. 15, the processing "MBx-VLD" indicates the variable length decoding with respect to the (x+1)th macroblock x (step S46 in FIG. 13), and the processing "MBx-DEC" indicates the decoding with respect to the (x+1)th video segment x (step S63 in FIG. 14).

As shown in FIG. 15, when the decoding is started, the first processor 2-1 sequentially carries out the variable length decoding from the macroblock 0.

When the variable length decoding of the macroblock 0 is ended in the first processor 2-1, the second processor 2-2 carries out the decoding MB0-DEC with respect to this data.

Further, when the variable length decoding of the next macroblock 1 is ended in the first processor 2-1, the third processor 2-3 carries out the decoding MB1-DEC with respect to this data.

Thereafter, the processor which ended the decoding among the second processor 2-2 and the third processor 2-3 fetches the data of the next macroblock subjected to the variable length decoding at the first processor 2-1 and carries out the encoding.

In this way, the first image encoding/decoding apparatus divides the processing steps of the encoding and decoding into steps able to be processed in parallel and steps relating to variable length coding/decoding not able to be processed in parallel and having to be processed sequentially, allots the steps for which sequential processing is necessary to the master processor and steps which can be processed in parallel to the slave processors, and then carries out the encoding and the decoding.

Accordingly, the sequentially input data is sequentially processed at these three processors 2-1 to 2-3 and transformed to the intended compressed and encoded data or the restored image data. By carrying out the encoding and the decoding by parallel processing in this way, the processing can be carried out at a higher speed compared with the usual case where the processing is carried out by one processor.

Second Image Encoding/decoding apparatus

In the first image encoding/decoding apparatus, however, since the sequential processing part (variable length coding and the variable length decoding) was allotted to a specific processor (first processor 2-1) in a fixed manner and that processor made to sequentially execute the processing, there was the disadvantage that the loads became nonuniform among the three processors 2-1 to 2-3.

In such a case, if the ratio of execution times of the sequential processing part and the parallel processing part were proportional to the ratio of the numbers of the processors for executing the sequential processing part and the parallel processing part, the loads would become uniform and equal, but if not proportional, the loads of the processors would become nonuniform and unequal resulting in a fall in the performance.

For example, in the parallel processing of MPEG encoding shown in FIG. 12, the load of the variable length coding is relatively light, therefore the first processor 2-1 frequently is idle. This becomes even more conspicuous in a parallel processing apparatus having two processors.

Further, also in the parallel processing of the MPEG decoding shown in FIG. 15, since the load of the variable length decoding is relatively light, the first processor 2-1 becomes idle at the point of time when one slice's worth of the variable length decoding is ended and until all decoding in the second processor 2-2 and the third processor 2-3 is ended.

Further, in the first image encoding/decoding apparatus, since the processing executed at the different processors is different, it is necessary to separately control the processors and synchronize the transfer of data and communication, so there also arises a disadvantage of complicated control.

Therefore, an explanation will be made of an image encoding/decoding apparatus according to the present invention, as a second image encoding/decoding apparatus, which solves such disadvantages, in particular, which can encode and decode an image at a further high speed and further which can simplify the structure and control method etc.

The hardware structure of the second image encoding/decoding apparatus is the same as that of the first image encoding/decoding apparatus mentioned above.

Namely, the parallel processing unit 1 has the configuration as shown in FIG. 9, i.e., has n number of processors 2-1 to 2-n, a memory 3, and a connection network 4. Note that these components are the same as those of the case of the parallel processing unit 9 of the first image encoding/decoding apparatus in terms of hardware structure and therefore will be explained by using the same reference numerals.

Further, the functions and configurations of the n number of processors 2-1 to 2-n to the connection network 4 are the same as those of the case of the parallel processing unit 9 of the first image encoding/decoding apparatus, so explanations thereof will be omitted.

Further, in the case of the parallel processing unit 1 of the second image encoding/decoding apparatus as well, the number n of processors is 3.

In the case of the parallel processing unit 1 of the second image encoding/decoding apparatus having the same hardware structure as that of the parallel processing unit 9 of the first image encoding/decoding apparatus, the method of the encoding and decoding of a moving picture and the operations of the processors 2-i (i=1 to 3) are different from those of the first image encoding/decoding apparatus.

Namely, the programs stored in the program ROMs or the program RAMs provided for the three processors 2-1 to 2-3 are different from those of the case of the first image encoding/decoding apparatus. Due to this, the parallel processing unit 1 of the second image encoding/decoding apparatus carries out processing different from that of the parallel processing unit 9 of the first image encoding/decoding apparatus as a whole.

In the second image encoding/decoding apparatus, the processors are made to divide and execute not only the parallel processing part, but also the sequential processing part.

For encoding, in the parallel processing unit 1 of the second image encoding/decoding apparatus, the processors divide and sequentially carry out the variable length coding of the macroblocks. Accordingly, each processor carries out all of the encoding, variable length coding, and local decoding for the macroblock it is in charge of. At this time, when the variable length coding of a certain macroblock is started, the end of the variable length coding is awaited only when the variable length coding of the previous macroblock has not yet been ended.

Further, for the decoding, in the parallel processing unit 1 of the second image encoding/decoding apparatus, the processors divide and sequentially carry out also the variable length decoding of the macroblocks. Accordingly, each processor carries out both of the variable length decoding and decoding for the macroblock it is in charge of. At this time, the end of the variable length decoding is awaited only when the variable length decoding of a certain macroblock has not yet been ended.

Below, an explanation will be made of the processing in each processor 2-i (i=1 to 3) when encoding and decoding a moving picture in the parallel processing unit 1 of the second image encoding/decoding apparatus and of the operation of the parallel processing unit 1.

First, an explanation will be made of the processing in each processor 2-i when encoding.

In the parallel processing unit 1 of the second image encoding/decoding apparatus, in the same way as the first image encoding/decoding apparatus mentioned above, one processor is decided on as the master process and the others as the slave processors and made to carry out different predetermined processing. However, the only difference of processing between the master processor and slave processors is that the master processor generates the headers and starts the slave processors: The encoding, the variable length coding, and the local decoding regarding the actual encoding are carried out at both of the master processor and the slave processors by similar procedures. Namely, the master processor and the slave processors carry out the processing by different processing procedures, but the main processing part of the encoding is carried out by the same procedure.

Below, an explanation will be made of the processing of each processor.

Figure 16:
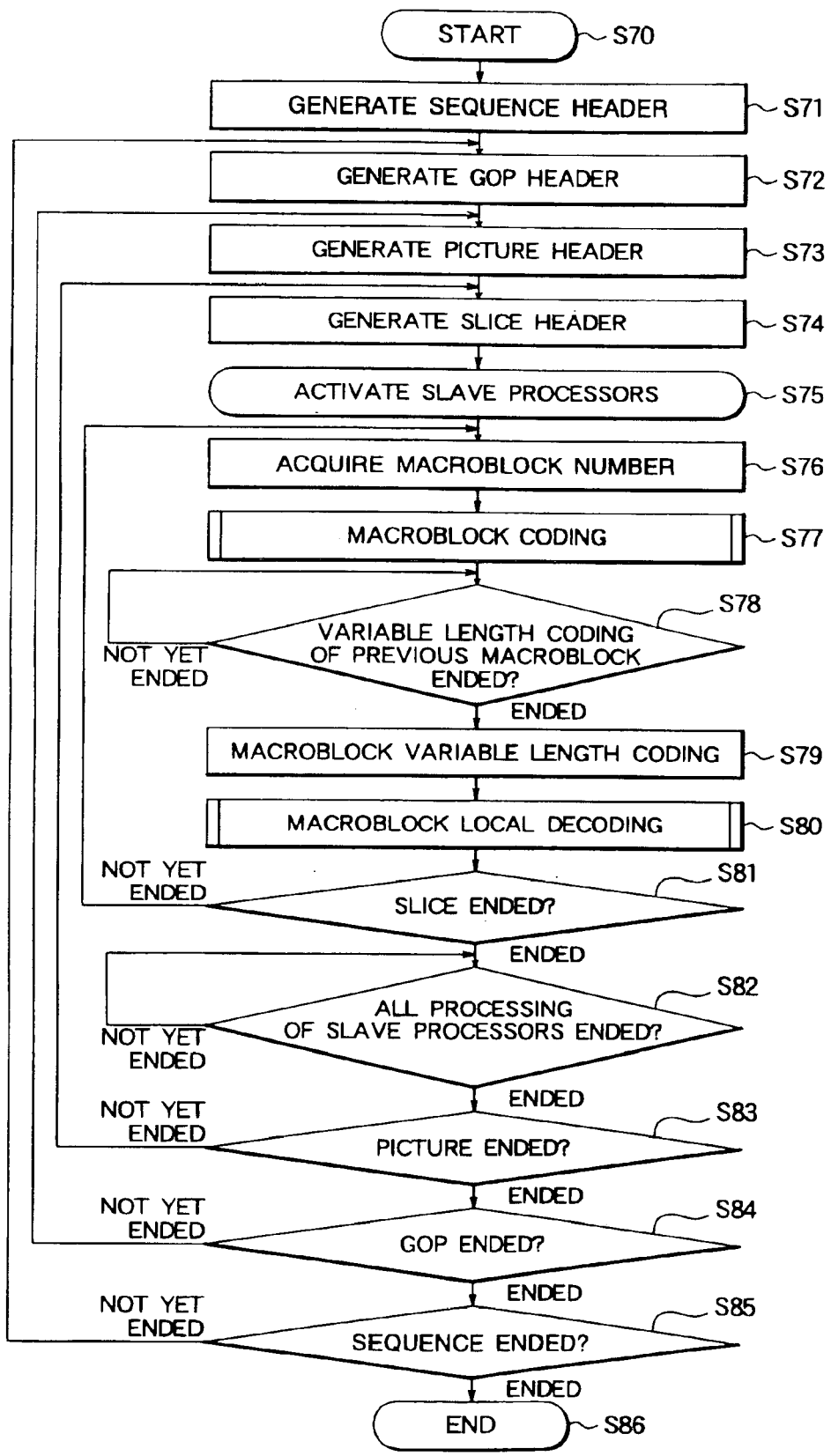
FIG. 16 is a flow chart of the processing in the case where an image is encoded by the parallel processing method according to the present invention in the master processor (first processor) of the parallel processing unit shown in FIG. 9.

First, the first processor 2-1 serving as the master processor carries out the processing as shown in the flow chart of FIG. 16.

Namely, when the encoding is started (step S70), the sequence header is generated (step S71), the GOP header is generated (step S72), the picture header is generated (step S73), and the slice header is generated (step S74).

When the generation of the slice header is ended, the master processor starts the slave processors (step S75).

When the start-up of the slave processors is ended, the master processor carries out the processing relating to the encoding in the same way as that by the slave processors.

Namely, first, it acquires the number of a macroblock to be processed (step S76) and encodes that macroblock (step S77).

Next, it confirms that the variable length coding of the previous macroblock is ended (step S78), carries out the variable length coding (step S79), and, further, carries out the local decoding (step S80).

This procedure is repeated until all processing inside the slice is ended (step S81). When all processing inside a slice is ended, the end of all processing in the slave processors is awaited (step S82).

Then, when all processing for one picture is ended, the processing routine shifts to the processing of the next picture (step S83). When the processing of all pictures of one GOP is ended, the processing routine shifts to the processing of the next GOP (step S84).

This processing is repeated until the sequence is ended (step S85), whereupon the processing is ended (step S86).

Figure 17:
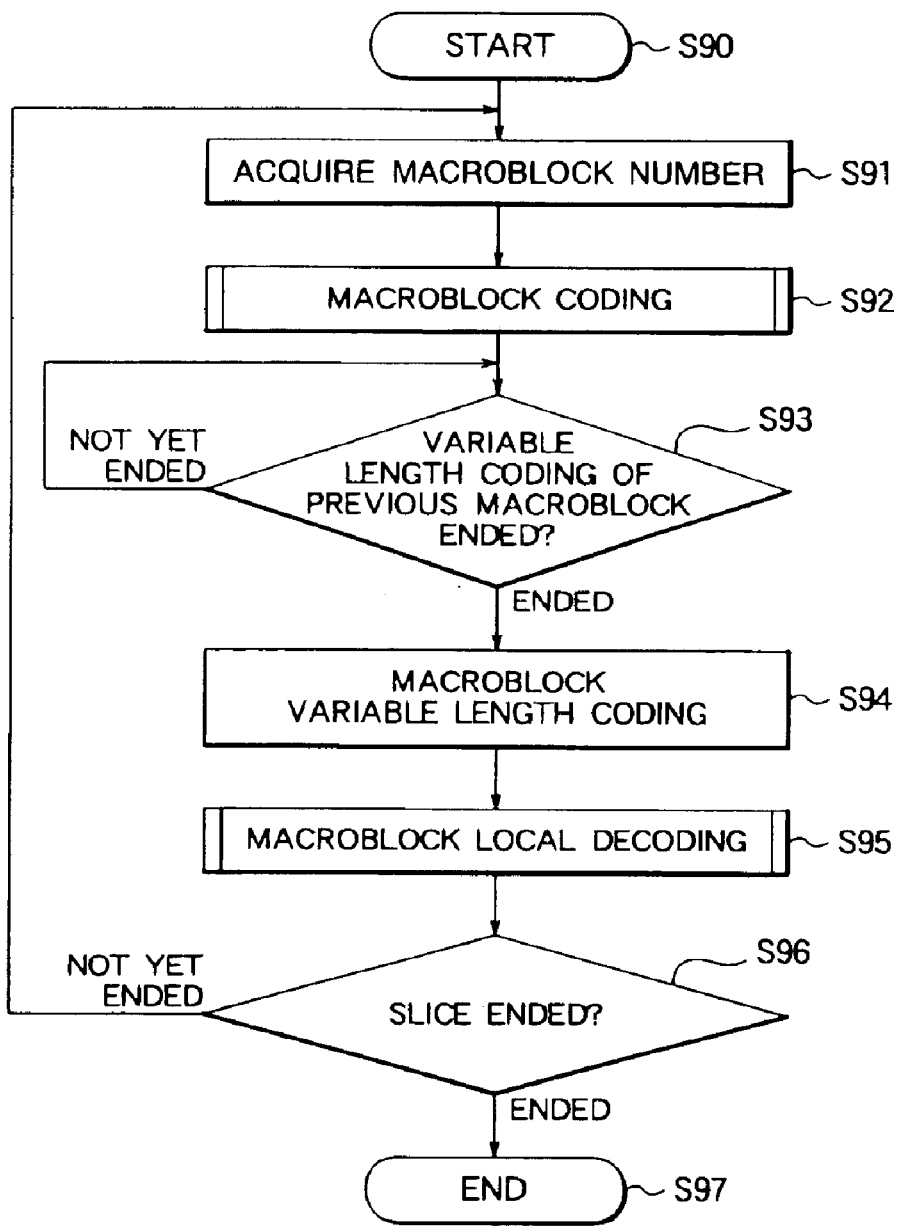
FIG. 17 is a flow chart of the processing in the case where an image is encoded by the parallel processing method according to the present invention in slave processors (second to n-th processors) of the parallel processing unit shown in FIG. 9.

Next, the second and third processors 2-2 and 2-3 serving as the slave processors carry out the processing as shown in the flow chart of FIG. 17.

Namely, when started by the processing of step S75 in the master processor and starting the encoding (step S90), first each slave processor obtain the number of the macroblock to be processed (step S91) and encodes that macroblock (step S92).

Next, it confirms that the variable length coding of the previous macroblock is ended (step S93), carries out the variable length coding (step S94), and further carries out the local decoding (step S95).

This procedure is repeated until all processing inside the slice is ended (step S96). When all processing inside the slice is ended, the processing in the slave processor is ended (step S97).

Next, an explanation will be made of the operation of the parallel processing unit 1 when encoding by the operation of three processors 2-1 to 2-3 by such a processing procedure by referring to FIG. 18.

Figure 18:
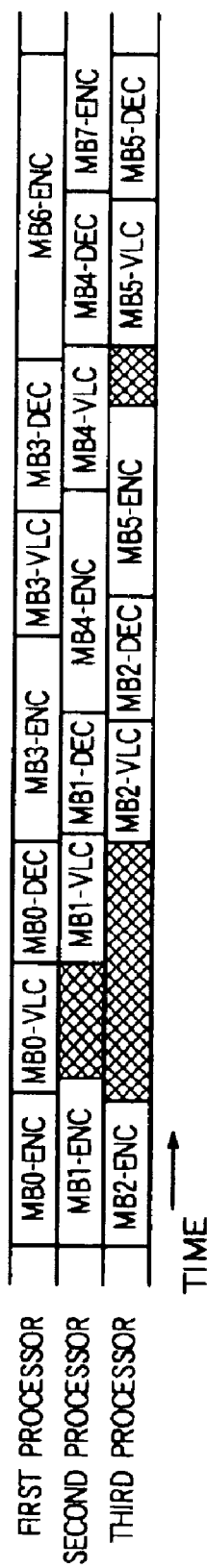
FIG. 18 is a timing chart of the state of processing in processors in a case where an image is encoded out by the parallel processing method according to the present invention in the parallel processing unit shown in FIG. 9.

FIG. 18 is a timing chart of the state of the encoding in the three processors 2-1 to 2-3.

Note that the reference symbols showing processings in FIG. 18 are the same as those shown in FIG. 12, so explanations will be omitted.

As illustrated, when the encoding is started, the three processors 2-1 to 2-3 start the encodings MB0-ENC, MB1-ENC, and MB2-ENC of the macroblock 0, macroblock 1, and macroblock 2.

Then, when the encoding MB0-ENC is ended, the first processor 2-1 successively carries out the variable length coding MB0-VLC of the macroblock 0 and, further, the local decoding MB0-DEC of the macroblock 0. Further, when the local decoding MB0-DEC of the macroblock 0 is ended, it starts the processing with respect to the next macroblock, that is, the macroblock 3, from the encoding MB3-ENC.

On the other hand, when the encoding MB1-ENC of the macroblock 1 is ended, the variable length coding MB0-VLC of the previous macroblock 0 is still being carried out at the first processor 2-1, therefore the second processor 2-2 waits for the end of this variable length coding. When this is ended, it starts the variable length coding MB1-VLC of the macroblock 1. Then, when the variable length coding MB1-VLC is ended, it carries out the local decoding MB1-DEC of the macroblock 1. Further, when the local decoding MB1-DEC of the macroblock 1 is ended, it starts the encoding MB4-ENC with respect to the next macroblock 4.

Further, in the third processor 2-3, when the encoding MB2-ENC of the macroblock 2 is ended, the variable length coding MB0-VLC and MB1-VLC of the previous macroblock 0 and macroblock 1 have not yet been ended, therefore, the end of the processing is awaited. When the variable length coding of the macroblock 0 and the macroblock 1 is ended, the variable length coding MB2-VLC of the macroblock 2 is carried out. When the variable length coding MB2-VLC is ended, the local decoding of the macroblock 2 is carried out. Further, when the local decoding MB2-DEC of the macroblock 2 is ended, the encoding MB5-ENC with respect to the next macroblock 5 is started.

In this way, the processors 2-1 to 2-3 successively select macroblocks x to be processed and carry out the encoding MBx-ENC, variable length coding MBx-VLC, and the local decoding MBx-DEC with respect to the macroblocks x.

By carrying out the processing in this way, the start of the processing need be awaited for only the variable length coding MBx-VLC when the variable length coding MB(x−1)-VLC with respect to the previous macroblock x−1 has not been ended, but the processing can be carried out completely in parallel for other portions.

In the variable length coding MBx-VLC thereof as well, the encoding is simultaneously started at the processors 2-1 to 2-3 just at the start of the processing as shown in FIG. 18. Therefore, requests for the start of the variable length coding are superimposed, and idling occurs in the processors 2-2 and 2-3. After this, however, the processing steps in the processors will always be offset from each other and therefore such idling will hardly ever occur. Also in the example shown in FIG. 18, no idling will occur at all in other parts it will only be necessary to wait a little in the variable length coding MB5-VLC of the macroblock 5 in the third processor 2-3.

Next, an explanation will be made of the processing in each processor 2-i when decoding in the second image encoding/decoding apparatus.

In the case of decoding as well, in the same way as the first image encoding/decoding apparatus, one processor is decided on as the master processor and the others as the slave processors and made to carry out processing different from each other. The master processor, however, differs from the processing of the slave processors only in the point that it decodes the headers and starts the slave processors: the variable length coding and decoding regarding the actual decoding are carried out by both of the master processor and slave processors by similar procedures. Namely, the master processor and the slave processors carry out processing by different processing procedures, but the main processing part of the decoding is achieved by the same procedure.

Below, an explanation will be made of the processing of each processor.

Figure 19:
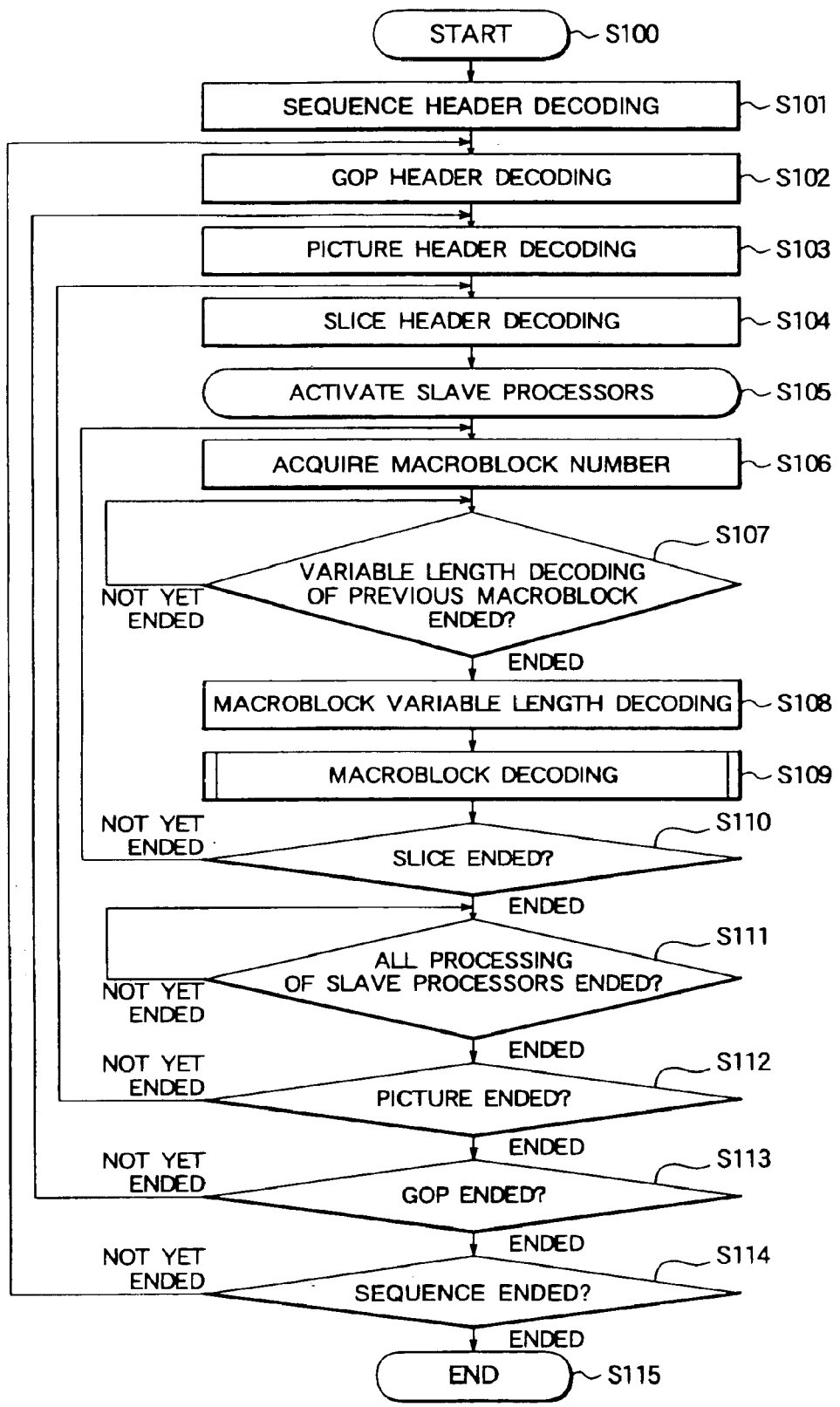
FIG. 19 is a flow chart of the processing in a case where an image is decoded by the parallel processing method according to the present invention in the master processor (first processor) of the parallel processing unit shown in FIG. 9.

First, the first processor 2-1 serving as the master processor carries out the processing as shown in the flow chart of FIG. 19.

Namely, when the decoding is started (step S100), the sequence header is decoded (step S101), the GOP header is decoded (step S102), the picture header is decoded (step S103), and the slice header is decoded (step S104).

Then, when the decoding of the slice header is ended, the master processor starts the slave processors (step S105).

When the start-up of the slave processors is ended, the master processor carries out processing relating to the decoding in the same way as that for the slave processors.

Namely, first, it acquires the number of the macroblock to be processed (step S106), confirms that the variable length decoding of the previous macroblock is ended (step S107), and carries out the variable length decoding of that macroblock (step S108).

When the variable length decoding is ended, it decodes that macroblock (step S109).

This procedure is repeated until all processing inside the slice is ended (step S110). When all processing inside the slice is ended, it waits for the end of all processing in the slave processors (step S111).

When all processing for one picture is ended, the processing routine shifts to the processing of the next picture (step S112). When the processing of all pictures of one GOP is ended, the processing routine shifts to the processing of the next GOP (step S113).

This processing is repeated until the sequence is ended (step S114), whereupon the processing is ended (step S115).

Figure 20:
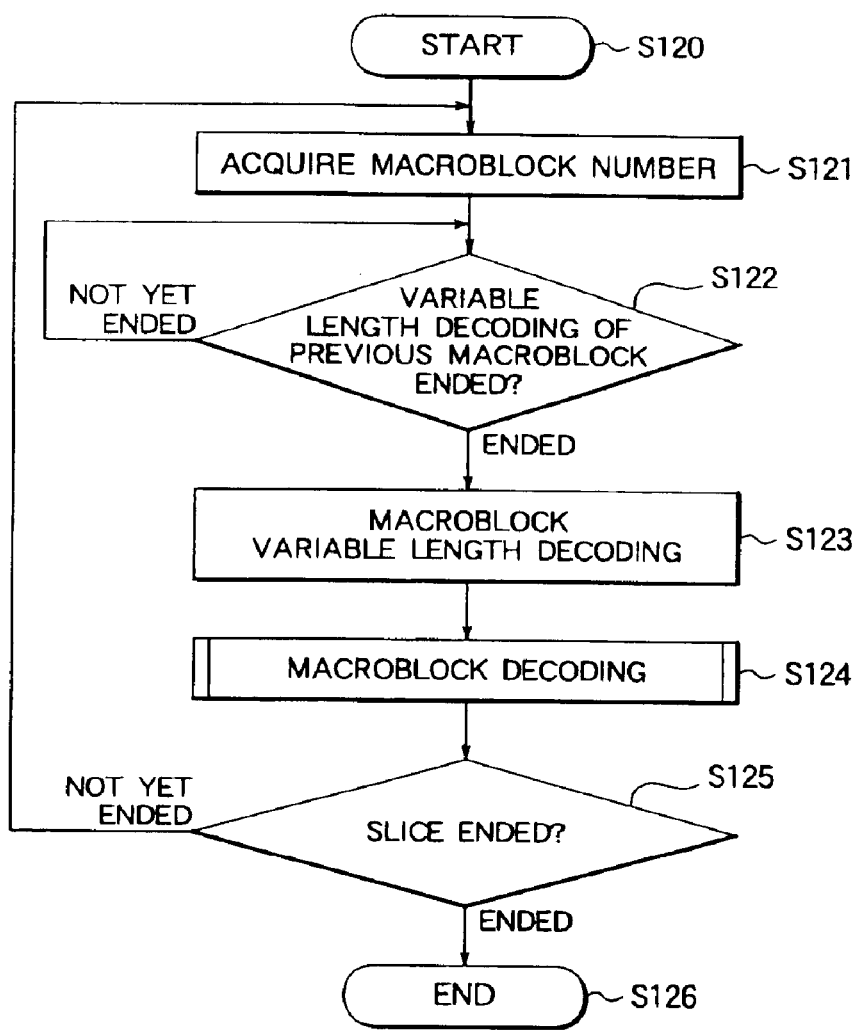
FIG. 20 is a flow chart of the processing in a case where an image is decoded by the parallel processing method according to the present invention in slave processors (second to n-th processors) of the parallel processing unit shown in FIG. 9.

Next, the second and third processors 22 and 2-3 serving as the slave processors carry out the processing as shown in the flow chart of FIG. 20.

Namely, when started by the processing of step S105 in the master processor and starting the decoding (step S120), first each slave processor acquires the number of the macroblock to be processed (step S121), confirms that the variable length decoding of the previous macroblock is ended (step S122), and then carries out the variable length decoding of that macroblock (step S123).

Next, when the variable length decoding is ended, it decodes that macroblock (step S124).

This procedure is repeated until all processing inside the slice is ended (step S125). When all processing inside the slice are ended, the processing in the slave processors is ended (step S126).

Next, an explanation will be made of the operation of the parallel processing unit 1 when decoding by the operation of the three processors 2-1 to 2-3 by such a processing procedure by referring to FIG. 21.

Figure 21:
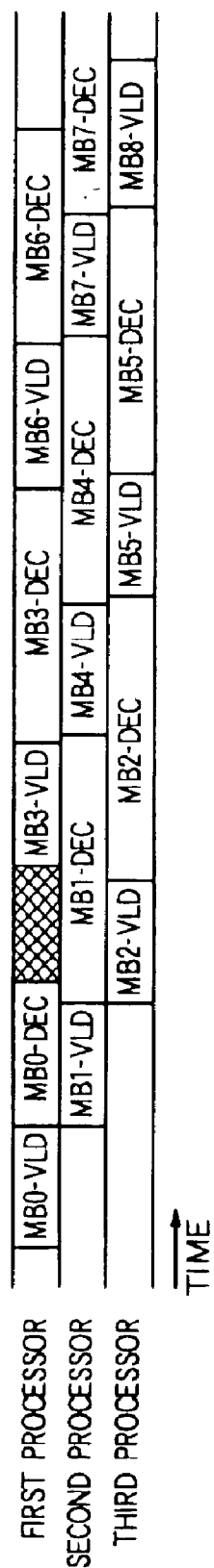
FIG. 21 is a flow chart of the state of processing in processors in a case where an image is decoded by the parallel processing method according to the present invention in the parallel processing unit shown in FIG. 9.

FIG. 21 is a timing chart of the state of the decoding in the three processors 2-1 to 2-3.

Note that reference symbols showing processing in FIG. 21 are the same as those shown in FIG. 15, so explanations will be omitted.

As illustrated, when the decoding is started, first, the first processor 2-1 carries out the variable length decoding MB0-VLD of the first macroblock 0.

The second processor 2-2 carries out the processing with respect to the macroblock 1, but since it is necessary to successively carry out the processing for every macroblock in variable length decoding, it carries out the variable length decoding MB1-VLD of the macroblock 1 after waiting for the end of the variable length decoding MB0-VLD of the macroblock 0 at the first processor 2-1.

The third processor 2-3 similarly carries out the variable length decoding MB2-VLD of the macroblock 2 after waiting for the end of the variable length decoding MB0-VLD for the macroblock 0 at the first processor 2-1 and the variable length decoding MB1-VLD for the macroblock 1 at the second processor 2-2.

The first processor 2-1 finishing the variable length decoding MB0-VLD with respect to the macroblock 0 successively carries out the decoding MB0-DEC with respect to the macroblock 0.

When that decoding MB0-DEC is ended, the processing with respect to the next macroblock 3 is started. At this time, however, as shown in FIG. 21, if the variable length coding MB2-VLD with respect to the previous macroblock 2 has not been ended, this is waited for before starting and the variable length decoding MB3-VLD with respect to the macroblock 3.

Below, similarly, the processors 2-1 to 2-3 successively select the macroblocks x to be processed and carry out the variable length decoding MBx-VLD and decoding MBx-DEC with respect to the macroblocks x.

By carrying out the processing in this way, while the start of the variable length decoding MBx-VLD is delayed when the variable length decoding MB(x−1)-VLD with respect to the previous macroblock x−1 has not been ended, the processings can be carried out completely in parallel for other portions.

In the variable length decoding MBx-VLD thereof as well, the decoding is simultaneously started at the processors 2-1 to 2-3 at the start of the processing as shown in FIG. 21, therefore the second processor 2-2 and the third processor 2-3 are made to wait and the idling occurs in the processing, but, thereafter, the processing steps in the processors will always be offset from each other and such idling will hardly ever occur. Also, in the example shown in FIG. 21, no idling at all occurs in other processing—though the variable length decoding MB3-VLD of the macroblock 3 at the first processor 2-1 is made to slightly wait.

In this way, the second image encoding/decoding apparatus, when carrying out MPEG encoding and decoding, the processors can carry out in a dispersed manner not only the encoding part, the local decoding part, and the decoding part which can be processed in parallel, but also the variable length coding part and variable length decoding part which must be sequentially processed.

Accordingly, the load of the sequential processing part can be uniformly and equally dispersed among the processors, and, as shown in FIG. 18 and FIG. 21, the idling time of the processors can be greatly reduced when compared with the first image encoding/decoding apparatus. As a result, the entire encoding and decoding speed can be greatly improved. Note that the effect becomes even more pronounced in a parallel processing apparatus having just two processors.

Further, in the parallel processing unit 1 of the second image encoding/decoding apparatus, each of a plurality of processors 2-1 to 2-n carries out a series of encoding and a series of decoding for the macroblock to be processed allotted to it on a continuous basis. For this reason, it is possible to synchronize the processors and reduce the load of the data communication etc. Further, as a result, all of the processing time can be used for the encoding and decodings. As a result, the loads at the processors substantially become uniform and equal, and the encoding and the decoding can be carried out efficiently and at a high speed.

Further, all processors can be operated substantially under the same control and processing procedure, therefore the hardware configuration becomes simple.

Further, the present invention provides a scalable parallel processing apparatus not depending upon the number of processors, so can be applied to parallel processing apparatus of various configurations.

Note that, the present invention is not limited to only the present embodiment. Various modifications are possible.

For example, in the parallel processing unit of the embodiment, while there is only one master processor, but there is no restriction on the number of slave processors. Any number is possible.

Further, the macroblock number acquired by a slave processor may be dynamically determined by the operating system, may be statically uniquely determined by a compiler or hardware, or may be determined by any other method.

Further, it is possible to adopt a configuration in which the programs to be executed at the processors are stored in ROMs in advance and then provided to the parallel processing unit of the image encoding/decoding apparatus or to adopt a configuration in which the programs are stored on a storage medium such as a hard disk or CD-ROM and read into program RAMs or the like at the time of execution.

Figure 1:
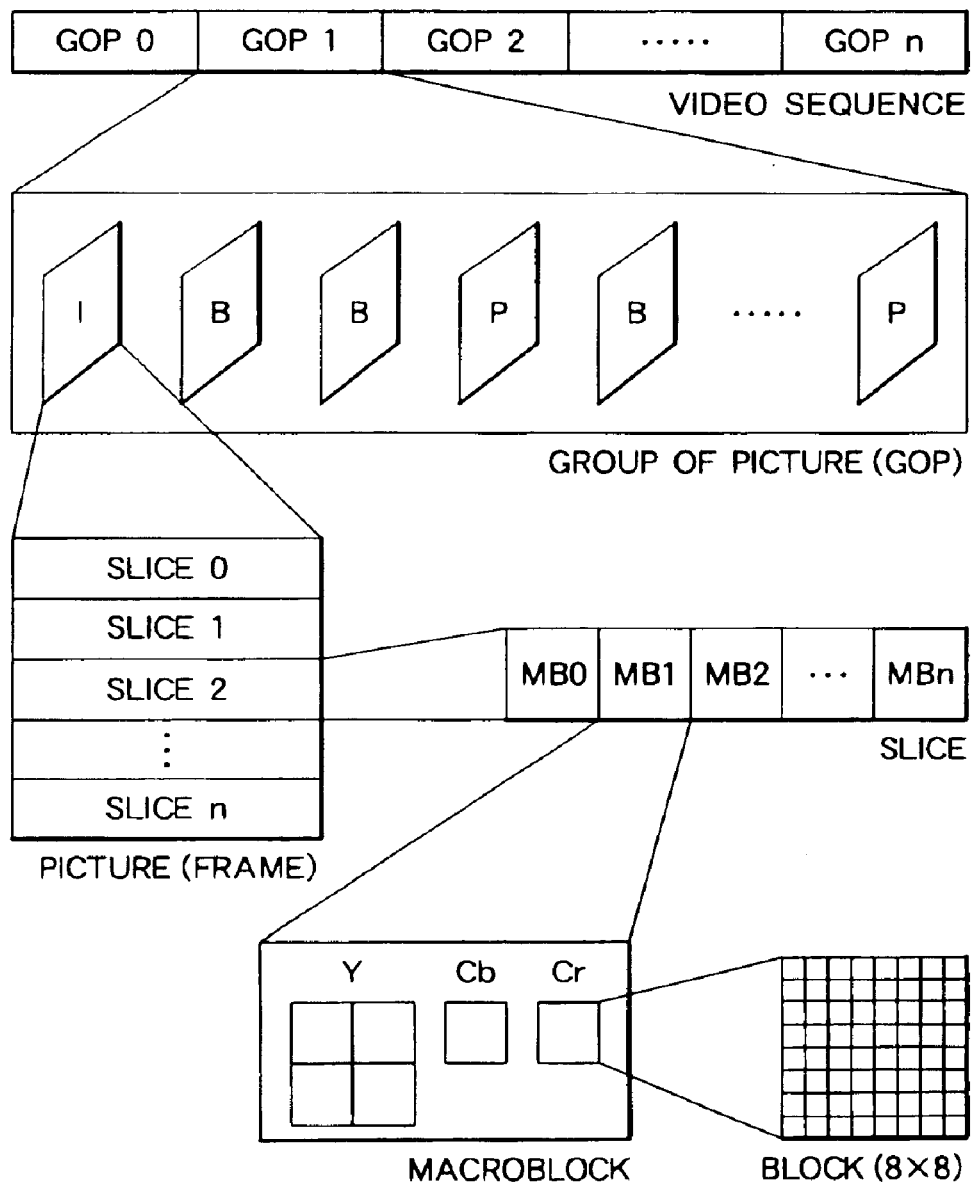
FIG. 1 is a view of the structure of image data in MPEG encoding.
Figure 2:
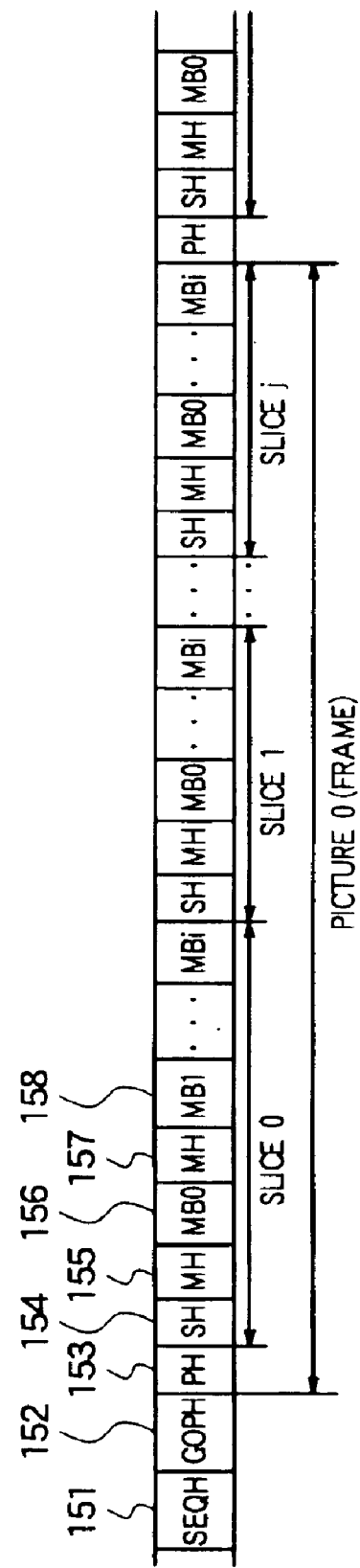
FIG. 2 is a view of the structure of an MPEG encoded image data bit stream.
Figure 3:
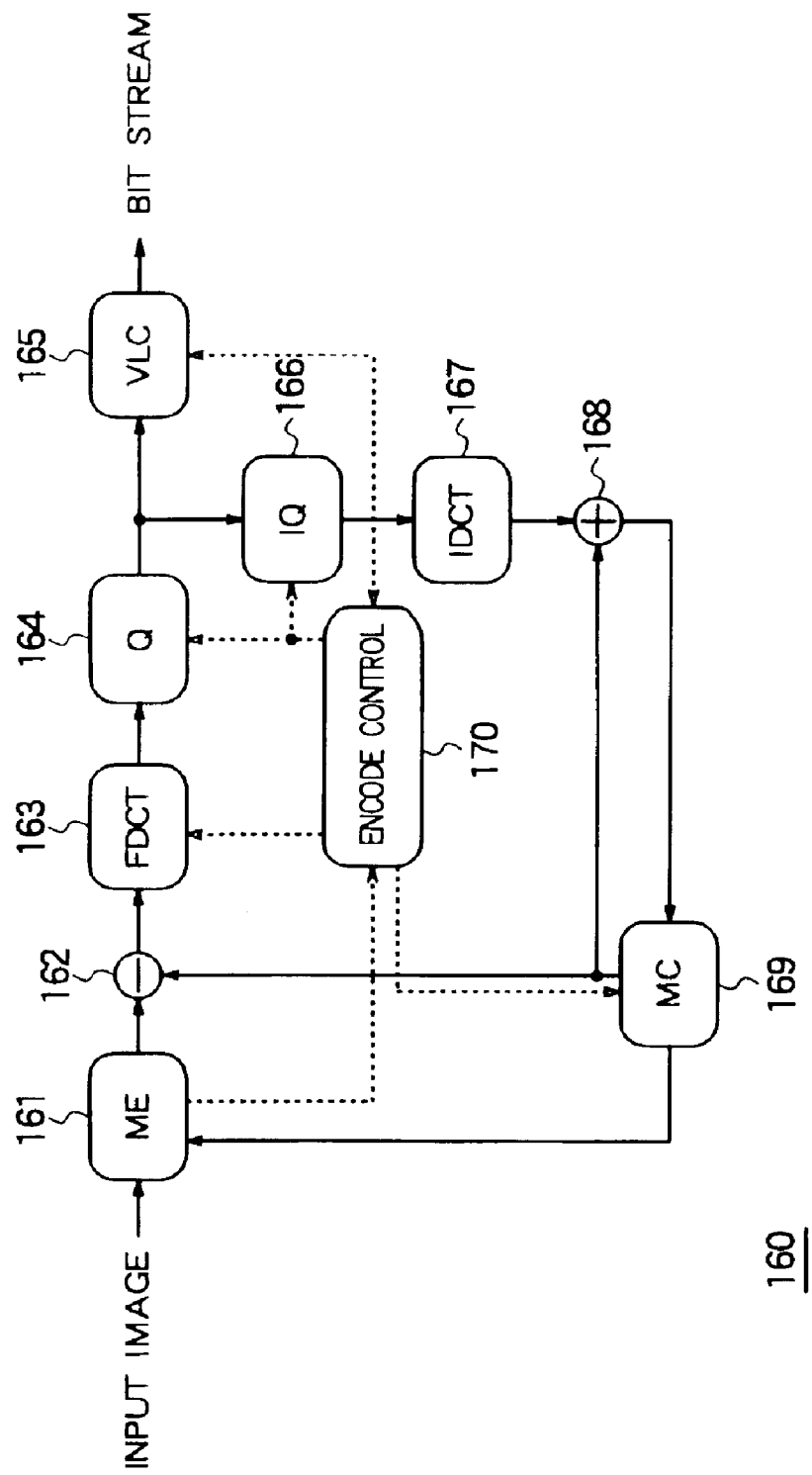
FIG. 3 is a block diagram of the configuration of a processing unit for carrying out the MPEG encoding.
Figure 4:
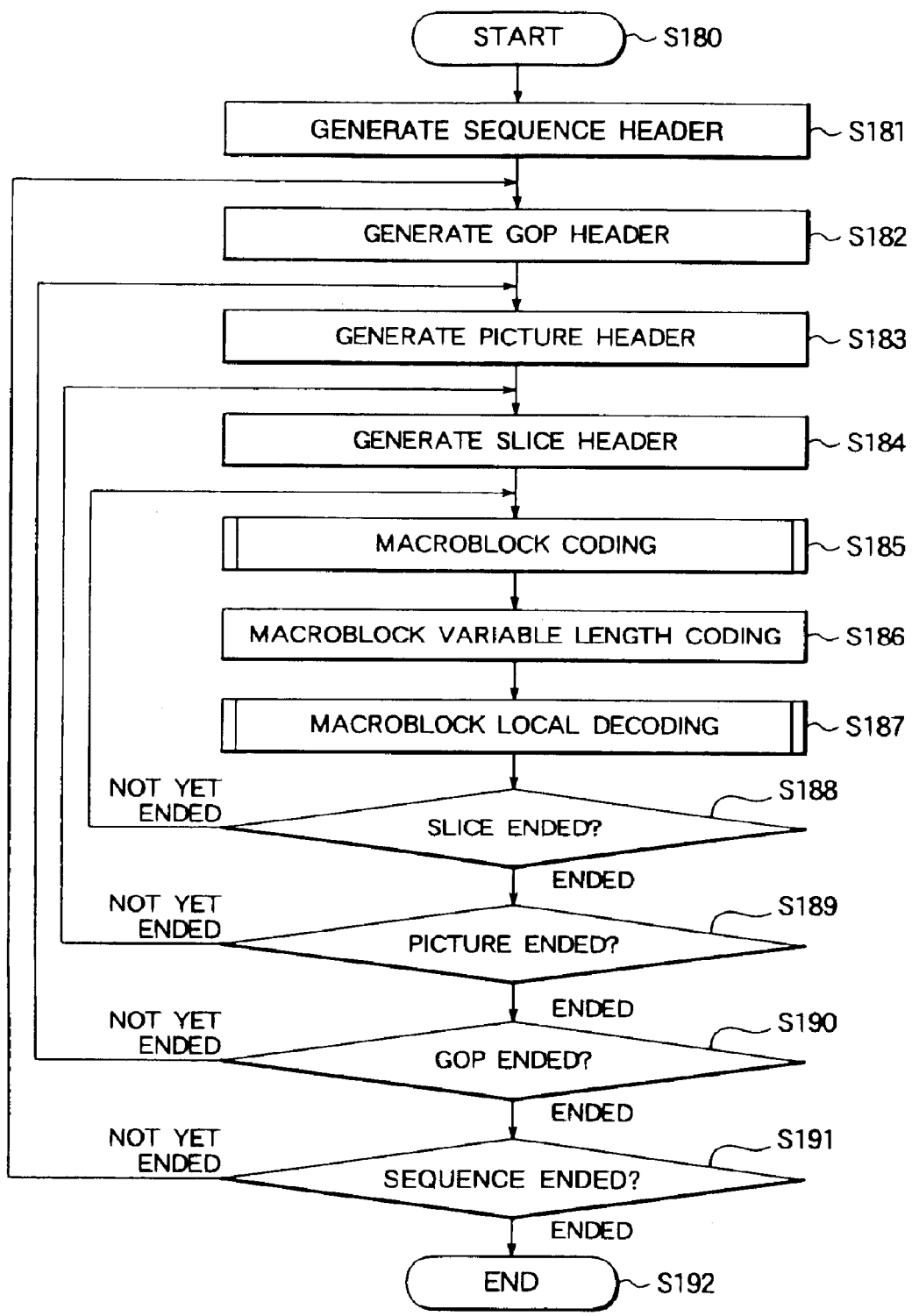
FIG. 4 is a flow chart of the flow of processing for generating a bit stream shown in FIG. 15 by carrying out MPEG encoding.
Figure 5:
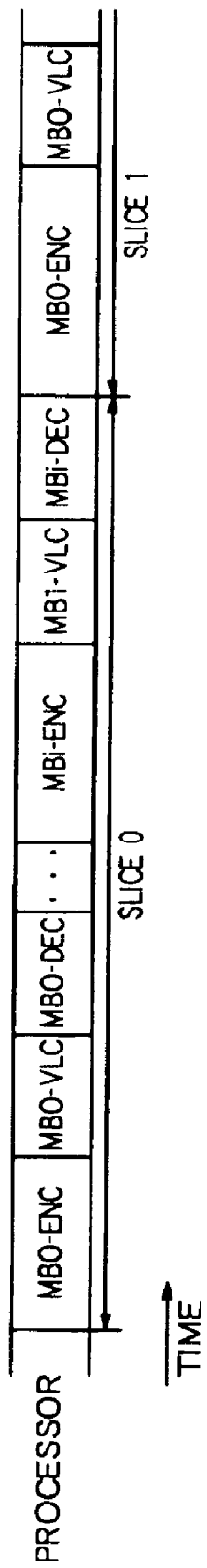
FIG. 5 is a timing chart of the operation of the processing unit when MPEG encoding is carried out by sequential processing.
Figure 6:
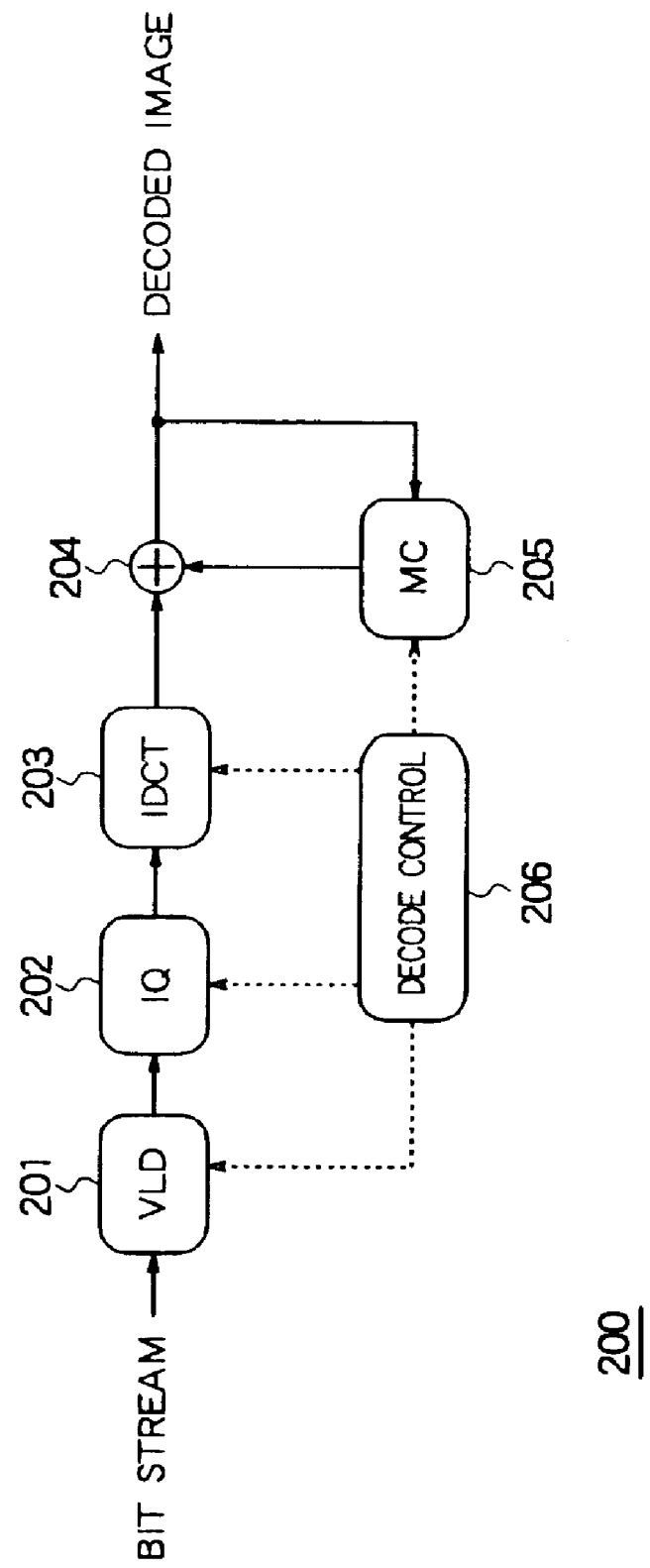
FIG. 6 is a block diagram of the configuration of a processing unit for carrying out MPEG decoding.
Figure 7:
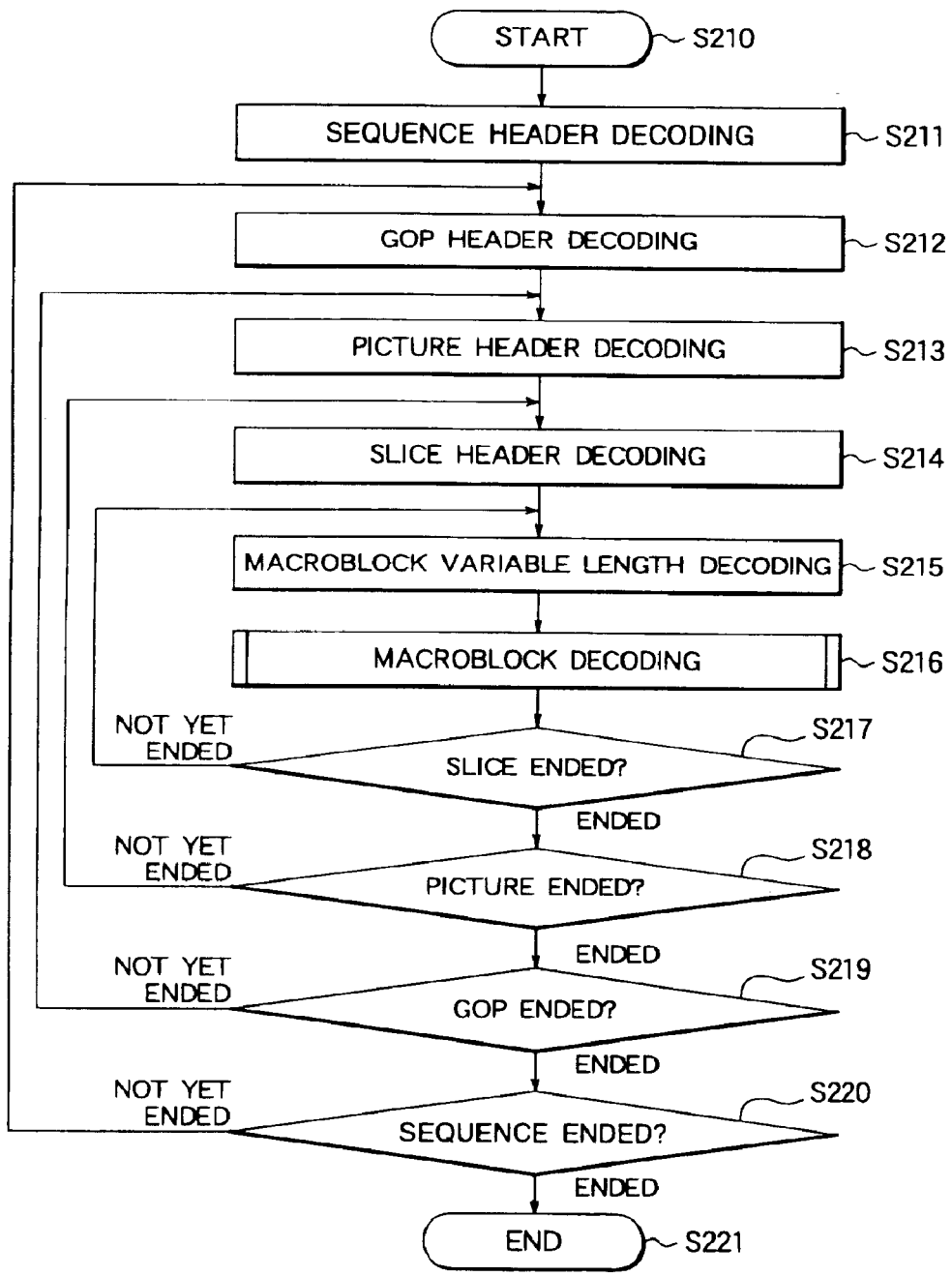
FIG. 7 is a flow chart of the flow of processing for generating a bit stream shown in FIG. 15 by carrying out MPEG decoding.
Figure 8:
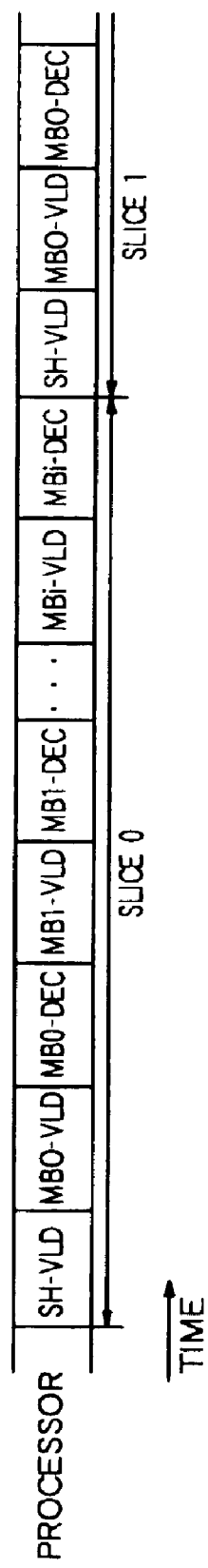
FIG. 8 is a timing chart of the operation of a processing unit when MPEG decoding is carried out by sequential processing.

Further, in the present embodiment, as the processor according to the present invention, as shown in FIG. 1, a shared memory type parallel processing apparatus was shown as an example, but the hardware configuration is not limited to this. A so-called "message communication" type parallel processing apparatus not having a common memory and carrying out the transfer etc. of the data "message communication" can be adopted as well.

Further, the invention is not restricted to a parallel processing apparatus in which processors are closely connected such as in the present embodiment and can also be applied to a apparatus comprised of respectively independent processors connected by any communication means to cooperate and carry out some intended processing.

Namely, the actual configuration of the apparatus may be arbitrarily determined.

Further, the parallel processing unit of the image encoding/decoding apparatus was configured having a plurality of processors carrying out predetermined operations according to certain programs operating in parallel to carry out the intended processing, but can also be configured having a plurality of processors comprised of dedicated hardware operating in parallel. For example, the present invention can also be applied to a circuit designed exclusively for variable length coding/decoding such as the encoding/decoding circuit of the MPEG, an image coding DSP, or a media processor.

Further, in the present embodiment, DCT was used as the transform system to be carried out at the encoding and decoding. However, any orthogonal transform system can be used as the transform system. Any transform, for example a Fourier transform such as a high speed Fourier transform (FET) and discrete Fourier transform (DFT), a Hadamard transform, and a K-L transform can be used.

Further, the present invention is not just applicable to the encoding and decoding of a moving picture as exemplified in the present embodiment. For example, it can also be applied to the encoding and decoding of audio data and text data and the encoding and the decoding of any other data.

Summarizing the advantageous effects of the present invention, as explained above, according to the encoding apparatus and decoder of the present invention, when carrying out the encoding and the decoding of, for example, image data, the loads can be equally and efficiently distributed among a plurality of processors and the communication for synchronization among the processors and data communication can be reduced. As a result, the encoding and decoding can be carried out at a high speed, and the control method and the hardware configuration can be simplified.

Further, according to the encoding method and the decoding method of the present invention, when carrying out the encoding and the decoding of for example image data by the parallel processing using a plurality of processors, the loads can be equally and efficiently distributed among the processors. Further, the communication for the synchronization among the processors and the data communication can be reduced. As a result, the encoding and decoding can be carried out at a high speed by easy control.

Further, the encoding method and the decoding method of the present invention are scalable methods in which the method of distribution of loads does not depend upon the structure of the parallel processor, for example, the number of the processors, so can be applied to parallel processors of a variety of configurations.

What is claimed is:

1. An encoding apparatus for producing encoded data blocks, wherein each of said data blocks is one of a macroblock or a slice, and wherein a first assigned data block assigned to a first process is produced in parallel with a second assigned data block assigned to a second process, and wherein the first process and the second process respectively include at least:

encoding means for performing a predetermined transform with respect to a prediction error or pixel value of the assigned data block, and quantizing the assigned data block with respect to a predetermined transform coefficient generated in said predetermined transform, and variable length coding means for performing variable length coding with respect to the result of said quantization to produce said encoded data blocks, and wherein variable length coding of said second assigned data block begins after variable length coding of said first assigned data block has ended, even if encoding of the second assigned data block is completed prior to the end of variable length coding of the first data block.

2. An encoding apparatus as set forth in claim 1, wherein said variable length coding means detects completion of variable length coding of a current data block and starts variable length coding of a subsequent data block.

3. An encoding apparatus as set forth in claim 2, further comprising:

a fixed length encoding means for performing fixed length encoding for each data block comprising an image slice, and wherein said variable length coding means performs variable length coding on each slice data block.

4. An encoding apparatus as set forth in claim 3, wherein said fixed length encoding means comprises:

a motion compensation predicting means for selectively carrying out motion compensation prediction by referring to a reference image, a transform means for carrying out a predetermined transform with respect to pixel data of a result of said motion compensation prediction or with respect to original pixel data to provide transformed block data, and a quantizing means for quantizing the transformed block data to provide quantized block data, and a local decoding means for decoding the transformed block data to generate the reference image to be supplied to said motion compensation predicting means, and wherein said variable length coding means carries out variable length coding on the quantized block data.

5. An encoding apparatus as set forth in claim 4, wherein said data blocks are macroblocks.

6. An encoding apparatus as set forth in claim 4, wherein said predetermined transform is any of a discrete cosine transform, a Fourier transform, a Hadamard transform, and a K-L transform.

7. An encoding method for encoding a data stream, the method comprising:

dividing said data stream into a plurality of data blocks, each data block comprising one of a macroblock and a slice;

encoding said data blocks in parallel to produce encoded data blocks, wherein for each respective data block, said encoding step comprises performing a predetermined transform with respect to a prediction error or pixel value of the data block, and quantizing the data block with respect to a predetermined transform coefficient generated in said predetermined transform;

successively carrying out variable length coding for each of the encoded data blocks with respect to the result of said quantizing step; and successively allotting additional data blocks that have completed variable length coding; wherein the variable length coding of a second data block begins after variable length coding of a first data block has ended, even if encoding of the second data block is completed prior to the end of variable length coding of the first data block.

8. An encoding method as set forth in claim 7, further comprising detecting when variable length coding for a current data block has been completed and beginning variable length coding of a subsequent data block.

9. An encoding method as set forth in claim 8, wherein said data stream comprises image data, and further comprising:

performing motion compensation prediction for said data blocks by referring to a reference image to generate compensated data blocks;

performing a predetermined transformation on the compensated data blocks to generate transformed data blocks;

quantizing the transformed data blocks to generate quantized data blocks; and obtaining the reference image from at least one of the quantized data blocks.

10. A decoding apparatus for decoding a data stream comprising a plurality of data blocks, the decoding apparatus comprising:

a system comprising a signal processing device, wherein each data block comprises a macroblock or a slice, and wherein a first assigned data block is decoded in parallel with a second assigned data block, and wherein the signal processing device includes at least:

variable length decoding means for performing variable length decoding with respect to encoded data of the first and second assigned data blocks, and decoding means for performing an inverse quantization with respect to the result of said variable length decoding, and an inverse predetermined transform with respect to the result of said inverse quantization, and wherein variable length decoding of said second assigned data block begins after variable length decoding of said first assigned data block has ended, and is performed in parallel with decoding of the first assigned data block.

11. A decoding apparatus as set forth in claim 10, wherein said variable length decoding means detects completion of the variable length decoding of a current data block and starts variable length decoding of a subsequent data block.

12. A decoding apparatus as set forth in claim 11, further comprising an allotting means for sequentially allotting the data blocks to said signal processing device, and wherein the signal processing device performs both the variable length decoding and the fixed length decoding of each data block.

13. A decoding apparatus as set forth in claim 11, wherein said data stream is a variable length coded image data stream obtained by fixed length and variable length encoding of image data blocks and wherein the signal processing device performs both the variable length decoding and the fixed length decoding of each data block.

14. A decoding apparatus as set forth in claim 13, wherein said decoding means of said signal processing device comprises
- an inverse quantizing means for inverse quantizing variable length decoded data blocks to obtain inverse quantized data blocks,
- an inverse transform means for carrying out an inverse transform on said inverse quantized data blocks to obtain inverse transformed data blocks,
- an image data generating means for generating original image data by referring to a reference image, and
- a motion compensation processing means for carrying out motion compensation processing based on at least one of the inverse transformed data blocks and said image data blocks to generate said reference image.

15. A decoding apparatus as set forth in claim 14, wherein said image data blocks are macroblocks.

16. A decoding apparatus as set forth in claim 14, wherein said inverse transform is one of a discrete cosine transform, Fourier transform, Hadamard transform, and K-L transform.

17. A decoding method for decoding a data stream comprising a plurality of data blocks wherein each data block is one of a macroblock or a slice, the method comprising:
- carrying out variable length decoding on each of the data blocks followed by fixed length decoding of each of the data blocks,
- wherein said variable length decoding is variable length decoding with respect to encoded data of each data block and producing quantized data blocks, and wherein
- said fixed length decoding of each data block comprise:
- performing an inverse quantization with respect to the result of said variable length decoding, and an inverse predetermined transform with respect to the result of said inverse quantization, and wherein
- variable length decoding of a second data block begins after variable length decoding of a first data block has ended, and is performed in parallel with fixed length decoding of the first data block.

18. A decoding method as set forth in claim 17, wherein said signal processing device detects when variable length decoding for a first data block has been completed and begins variable length decoding of a second data block.

19. A decoding method as set forth in claim 18, wherein said data stream comprises a plurality of image data blocks,
and further comprising, in said signal processing device,
- inverse quantizing the image data blocks to generate quantized data blocks;
- performing an inverse transformation on the quantized data blocks to generate transformed data blocks;
- obtaining original image data from at least one of the transformed data blocks; and
- performing motion compensation processing for said transformed data blocks.

* * * * *